(12) United States Patent
Chong et al.

(10) Patent No.: US 11,012,323 B2
(45) Date of Patent: May 18, 2021

(54) FEATURE PARAMETER OBTAINING METHOD AND APPARATUS

(71) Applicant: HUAWEI TECHNOLOGIES CO., LTD., Guangdong (CN)

(72) Inventors: Weiwei Chong, Shanghai (CN); Xiaobo Wu, Shanghai (CN); Yang Xin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/832,916

(22) Filed: Mar. 27, 2020

(65) Prior Publication Data

US 2020/0228422 A1 Jul. 16, 2020

Related U.S. Application Data

(63) Continuation of application No. PCT/CN2018/104141, filed on Sep. 5, 2018.

(30) Foreign Application Priority Data

Sep. 30, 2017 (CN) .......................... 201710914073.5

(51) Int. Cl.
*H04L 12/24* (2006.01)
(52) U.S. Cl.
CPC ........ *H04L 41/5038* (2013.01); *H04L 41/046* (2013.01); *H04L 41/14* (2013.01); *H04L 41/5054* (2013.01)
(58) Field of Classification Search
CPC ... H04L 41/14; H04L 41/046; H04L 41/5054; H04L 67/14
See application file for complete search history.

(56) References Cited

U.S. PATENT DOCUMENTS 10,057,165 B2 * 8/2018 Liu ...................... H04L 45/745
10,887,326 B2 * 1/2021 Weizman .............. G06F 21/552
(Continued)

FOREIGN PATENT DOCUMENTS

CN 101072131 A 11/2007
CN 101383733 A 3/2009
(Continued)

OTHER PUBLICATIONS

ATandT et al, "NWDA services", 3GPP SA WG2 Meeting #120 S2-172499, Mar. 31, 2017, total 4 pages.
(Continued)

*Primary Examiner* — Shean Tokuta
(74) *Attorney, Agent, or Firm* — Womble Bond Dickinson (US) LLP

(57) ABSTRACT

A feature parameter obtaining method and apparatus are disclosed. The method includes: obtaining feature set information from a data analytics network element, where a feature set corresponding to the feature set information includes a first part of feature and a second part of feature; obtaining a first feature parameter of the first part of feature when data corresponds to the first part of feature; sending a request message to at least one second network element, to request a second feature parameter of the second part of feature when the data corresponds to the second part of feature; receiving the second feature parameter from the at least one second network element; and sending, based on the first feature parameter and the second feature parameter, a third feature parameter of the feature set when the data corresponds to the feature set to the data analytics network element.

20 Claims, 6 Drawing Sheets

(56) References Cited

U.S. PATENT DOCUMENTS

| | | | |
|---|---|---|---|
| 10,887,470 B2* | 1/2021 | Shaw | H04W 24/02 |
| 2014/0045452 A1* | 2/2014 | Ma | H04W 4/70 |
| | | | 455/406 |
| 2017/0034195 A1 | 2/2017 | Lee et al. | |
| 2017/0078157 A1 | 3/2017 | Zhang | |
| 2019/0191330 A1* | 6/2019 | Dao | H04L 12/4633 |
| 2020/0112921 A1* | 4/2020 | Han | H04W 8/22 |
| 2020/0220602 A1* | 7/2020 | Li | H04W 76/11 |
| 2020/0228429 A1* | 7/2020 | Xin | H04W 24/02 |
| 2020/0322835 A1* | 10/2020 | Xin | H04W 28/0268 |

FOREIGN PATENT DOCUMENTS

| | | |
|---|---|---|
| CN | 102271364 A | 12/2011 |
| CN | 102315974 A | 1/2012 |
| CN | 105357691 A | 2/2016 |
| CN | 105608194 A | 5/2016 |
| CN | 105634787 A | 6/2016 |
| CN | 106682394 A | 5/2017 |
| EP | 3681193 A1 | 7/2020 |
| WO | 2015113636 A1 | 8/2015 |
| WO | WO-2019062497 A1 * | 4/2019 ............ H04L 67/14 |
| WO | WO-2019062498 A1 * | 4/2019 ............ H04L 41/14 |

OTHER PUBLICATIONS

3GPP TR 23.791,V0.5.0,: 3rd Generation Partnership Project; Technical Specification Group Services and System Aspects; Study of Enablers for Network Automation for 5G (Release 16) ,Jul. 19, 2018 (Jul. 19, 2018),pp. 1-48, XP051475034.

3GPP Draft; 23799-DI FF 121 200,: 3rd Generation Partnership Project; Technical Specification Group Services and System Aspects; Study on Architecture for Next Generation System (Release 14),Dec. 1, 2016 ;(Dec. 1, 2016), XP051199312,total 532 pages.

Huawei:"Discussion about Big Data Driven Network Architecture",3GPP Draft; S2-173192,May 9, 2017 (May 9, 2017), XP051268656,total 12 pages.

Ericsson, PCF Discovery and Selection. SA WG2 Meeting #121, May 15-19, 2017, Hangzhou, China, S2-173007, 5 pages.

* cited by examiner

FEATURE PARAMETER OBTAINING METHOD AND APPARATUS

CROSS-REFERENCE TO RELATED APPLICATION

This application is a continuation of International Application No. PCT/CN2018/104141, filed on Sep. 5, 2018, which claims priority to Chinese Patent Application No. 201710914073.5, filed on Sep. 30, 2017. The disclosure of the aforementioned applications is hereby incorporated by reference in their entireties.

TECHNICAL FIELD

Embodiments of the present disclosure relate to the field of communications technologies, and more specifically, to a feature parameter obtaining method and apparatus.

BACKGROUND

In a 5th generation (5G) communications network, a network data analytics (NWDA) network element is used. The NWDA network element uses a big data analytics method to perform model training, and uses a trained model to analyze data. However, in the prior art, a specific method for performing data analytics by using an NWDA network element in a communications network is not provided.

SUMMARY

Embodiments of the present disclosure provides a feature parameter obtaining method and apparatus, to implement data analysis in a communication network by using a data analytics network element.

A first aspect of the present disclosure provides a feature parameter obtaining method. The method includes: obtaining, by a first network element, feature set information from a data analytics network element, where a feature set corresponding to the feature set information includes a first part of feature and a second part of feature; obtaining, by the first network element, a first feature parameter of the first part of feature when data corresponds to the first part of feature; sending, by the first network element, a request message to at least one second network element, where the request message is used to request a second feature parameter of the second part of feature when the data corresponds to the second part of feature; receiving, by the first network element, the second feature parameter from the at least one second network element; and sending, by the first network element based on the first feature parameter and the second feature parameter, a third feature parameter of the feature set when the data corresponds to the feature set to the data analytics network element. Because the first network element can obtain the feature parameter of the feature set when the data corresponds to the feature set from another network element, features in the feature set are not limited to features that the first network element can obtain. Therefore, features in the feature set can be more comprehensive, so that a feature parameter fed back by the first network element is more accurate.

With reference to any possible implementation of the first aspect, in a second possible implementation of the first aspect, the method further includes: obtaining, by the first network element, a response result from the data analytics network element for the third feature parameter; and processing, by the first network element, the data based on the response result.

With reference to the second possible implementation of the first aspect, in a third possible implementation of the first aspect, the method further includes: obtaining, by the first network element based on the response result, a service type associated with the data or an execution rule associated with the data. The processing, by the first network element, the data based on the response result includes: forwarding, by the first network element, the data based on service priority information indicated in the execution rule associated with the data; or adding, by the first network element, label information of the service type to the data based on the service type associated with the data or the execution rule associated with the data; or adding, by the first network element, scheduling priority information to the data based on the service type associated with the data or the execution rule associated with the data; or performing, by the first network element, charging statistics on the data based on the service type associated with the data or the execution rule associated with the data; or determining, by the first network element, that a destination address of the data is an address of the terminal device and the terminal device is in an idle state, and sending, by the first network element, paging priority information of the terminal device based on the service type associated with the data or the execution rule associated with the data. In the method in this embodiment, the data can be processed by using the response result that is from a feature analytics network element, to refine the data.

In any possible implementation of the first aspect, the response result includes service type information associated with the data and/or execution rule information associated with the data.

A second aspect of the present disclosure provides a data analysis method. The method includes: sending, by a data analytics network element, feature set information to a first network element, where a feature set corresponding to the feature set information includes a first part of feature and a second part of feature; receiving, by the data analytics network element, a first feature parameter, data of which corresponds to the first part of feature, from the first network element; sending, by the data analytics network element, a request message to at least one second network element, where the request message is used to request a second feature parameter of the second part of feature when the data corresponds to the second part of feature; receiving, by the data analytics network element, the second feature parameter from the at least one second network element; and determining, by the data analytics network element, service type information corresponding to the data or execution rule information corresponding to the data based on the first feature parameter and the second feature parameter.

In a first possible implementation of the second aspect, the second part of feature is a feature, in the feature set, that the data analytics network element needs to obtain from the second network element.

In any possible implementation of the second aspect, the method further includes: obtaining, by the data analytics network element, at least one of identification information of a terminal device corresponding to the data, address information of the terminal device and the feature set information that are from the first network element.

In any possible implementation of the second aspect, the second part of feature includes at least one of a type of the terminal device corresponding to the data, identification information of a cell in which the terminal device is located and signal quality of the cell in which the terminal device is located.

In any possible implementation of the second aspect, the determining, by the data analytics network element, service type information corresponding to the data or execution rule information corresponding to the data based on the first feature parameter and the second feature parameter includes: determining, by the data analytics network element based on the first feature parameter and the second feature parameter, a third feature parameter of the feature set when the data corresponds to the feature set; and determining, by the data analytics network element, the service type information corresponding to the data or the execution rule information corresponding to the data based on the third feature parameter.

In any possible implementation of the second aspect, the method further includes: sending, by the data analytics network element, the service type information corresponding to the data or the execution rule information corresponding to the data to the first network element.

In any possible implementation of the second aspect, before the sending, by a data analytics network element, feature set information to a first network element, the method further includes: obtaining, by the data analytics network element, training data; and obtaining, by the data analytics network element, the feature set information based on the training data.

A third aspect of the present disclosure provides a feature parameter obtaining method. The method includes: obtaining, by a second network element, feature set information from a first network element; obtaining, by the second network element, a feature parameter of a partial feature in a feature set when data corresponds to the partial feature; and sending, by the second network element, the feature parameter to the first network element.

In any possible implementation of the third aspect, the obtaining, by a second network element, feature set information from a first network element includes: receiving, by the second network element, a request message from the first network element, where the request message includes the feature set information.

In any possible implementation of the third aspect, the request message further includes identification information of a terminal device corresponding to data and/or address information of the terminal device.

A fourth aspect of the present disclosure provides an apparatus for obtaining feature parameter. The apparatus includes: a transceiver unit, configured to obtain feature set information from a data analytics network element, where a feature set corresponding to the feature set information includes a first part of feature and a second part of feature; and a processing unit, configured to obtain a first feature parameter of the first part of feature when data corresponds to the first part of feature. The transceiver unit is further configured to: send a request message to at least one second network element, where the request message is used to request a second feature parameter of the second part of feature when the data corresponds to the second part of feature; receive the second feature parameter from the at least one second network element; and send, based on the first feature parameter and the second feature parameter, a third feature parameter of the feature set when the data corresponds to the feature set to the data analytics network element.

In a first possible implementation of the fourth aspect, the transceiver unit is further configured to obtain a response result from the data analytics network element for the third feature parameter, and the processing unit is further configured to process the data based on the response result.

In a second possible implementation of the fourth aspect, the processing unit is configured to obtain, based on the response result, a service type associated with the data or an execution rule associated with the data.

In a third possible implementation of the fourth aspect, the processing unit is configured to forward the data based on service priority information indicated in the execution rule associated with the data; or the processing unit is configured to add label information of the service type to the data based on the service type associated with the data or the execution rule associated with the data; or the processing unit is configured to add scheduling priority information to the data based on the service type associated with the data or the execution rule associated with the data; or the processing unit is configured to perform charging statistics on the data based on the service type associated with the data or the execution rule associated with the data; or the processing unit is configured to determine that a destination address of the data is an address of the terminal device and the terminal device is in an idle state, and the transceiver unit is configured to send paging priority information of the terminal device based on the service type associated with the data or the execution rule associated with the data.

A fifth aspect of the present disclosure provides a data analysis apparatus. The data analysis apparatus includes: a transceiver unit, configured to send feature set information to a first network element, where a feature set corresponding to the feature set information includes a first part of feature and a second part of feature, receive a first feature parameter, data of which corresponds to the first part of feature, from the first network element, send a request message to at least one second network element, where the request message is used to request a second feature parameter of the second part of feature when the data corresponds to the second part of feature, and receive the second feature parameter from the at least one second network element; and a processing unit, configured to determine service type information corresponding to the data or execution rule information corresponding to the data based on the first feature parameter and the second feature parameter.

In a first possible implementation of the fifth aspect, the transceiver unit is further configured to receive at least one of identification information of a terminal device corresponding to the data, address information of the terminal device and the feature set information that are from the first network element.

In a second possible implementation of the fifth aspect, the processing unit is configured to determine a third feature parameter of the feature set when the data corresponds to the feature set based on the first feature parameter and the second feature parameter, and determine service type information corresponding to the data and execution rule information corresponding to the data based on the third feature parameter.

In a second possible implementation of the fifth aspect, the transceiver unit is further configured to send the service type information corresponding to the data or the execution rule information corresponding to the data to the first network element.

In the second possible implementation of the fifth aspect, the transceiver unit is further configured to obtain training data, and the processing unit is further configured to obtain the feature set information based on the training data.

A sixth aspect of the present disclosure provides a feature parameter obtaining apparatus. The apparatus includes: a transceiver unit, configured to obtain feature set information from a first network element; and a processing unit, configured to obtain a feature parameter of a partial feature in a feature set when data corresponds to the partial feature. The transceiver unit is further configured to send the feature parameter to the first network element.

In a possible implementation, the transceiver unit receives a request message from the first network element, where the request message includes the feature set information. The request message further includes identification information of a terminal device corresponding to data and/or address information of the terminal device.

In any possible implementation of the first aspect to the sixth aspect in the present disclosure, the second part of feature is a feature, in the feature set, that the first network element needs to obtain from the at least one second network element.

In any possible implementation of the first aspect to the sixth aspect in the present disclosure, the request message includes at least one of identification information of a terminal device corresponding to the data, address information of the terminal device and the feature set information.

In any possible implementation of the first aspect to the sixth aspect in the present disclosure, the second part of feature includes at least one of a type of the terminal device corresponding to the data, identification information of a cell in which the terminal device is located and signal quality of the cell in which the terminal device is located.

In any possible implementation of the first aspect to the sixth aspect in the present disclosure, the feature set information is a feature index set.

In any possible implementation of the first aspect to the sixth aspect in the present disclosure, the first feature parameter, the second feature parameter or the third feature parameter is an eigenvector.

In any possible implementation of the first aspect to the sixth aspect in the present disclosure, the feature set information corresponds to at least one service type or at least one execution rule.

According to a seventh aspect of the present disclosure, a communications apparatus is provided. The communications apparatus includes: a storage unit, configured to store a computer instruction; and a processing unit, configured to perform any method according to the first aspect to the third aspect and all possible implementations based on the computer instruction stored in the storage unit.

According to an eighth aspect, a computer storage medium is provided. The computer-readable storage medium stores an instruction, and when the instruction is run on a computer, the computer is caused to perform any method according to the first aspect to the third aspect and all possible implementations.

According to a ninth aspect, a computer program product including an instruction is provided. When the computer program product is run on a computer, the computer is caused to perform any method according to the first aspect to the third aspect and all possible implementations.

DESCRIPTION OF EMBODIMENTS

Embodiments of the present disclosure may be used in a Long Term Evolution (LTE) network, a 5G or next generation network, a fixed network, a home NodeB network, a non-3GPP (such as WiFi) accessed mobile network, or the like. In the present disclosure, an example in which the embodiments of the present disclosure are applied in the 5G network is used for descriptions.

Figure 1:
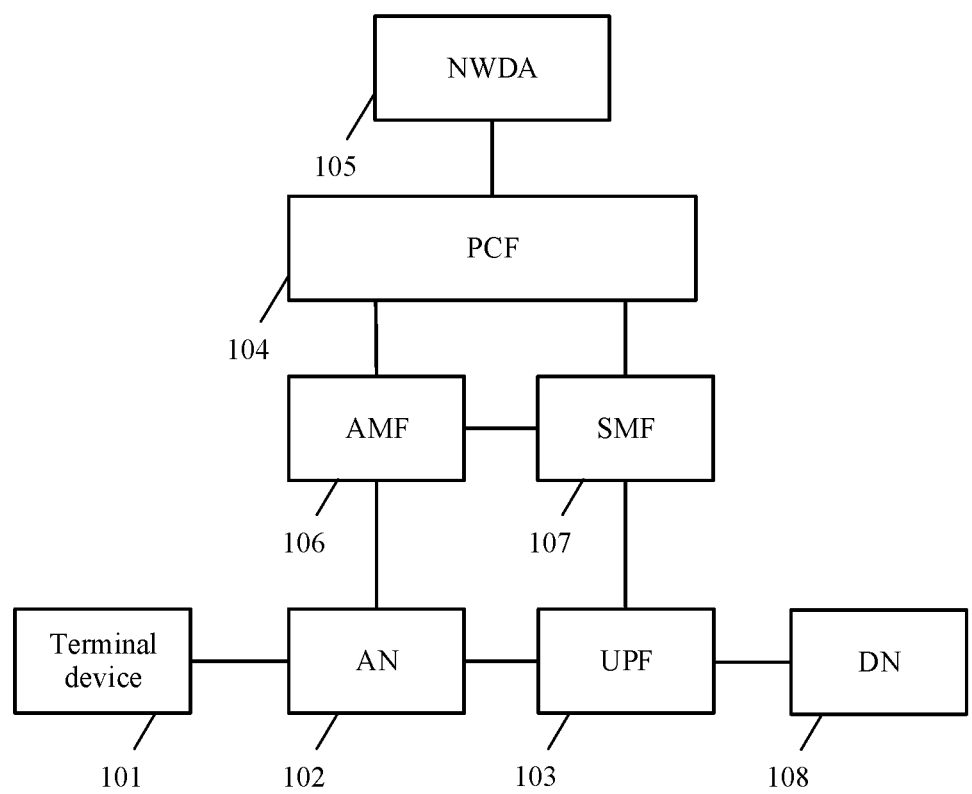
FIG. 1 is a schematic diagram of a communications system for implementing embodiments of the present disclosure.

FIG. 1 is a schematic diagram of a communications system that can implement an embodiment of the present disclosure. In the communications system, the terminal device 101 accesses a core network by using an access network (AN) device.

The terminal device 101 includes but is not limited to: user equipment (UE), a subscriber unit, a subscriber station, a mobile station, a mobile, a remote station, a remote terminal device, a mobile terminal device, a user terminal device, a terminal device, a wireless communications device, a user agent, a user apparatus, a cellular phone, a cordless phone, a Session Initiation Protocol (SIP) phone, a wireless local loop (WLL) station, a personal digital assistant (PDA), a handheld device having a wireless communication function, a computing device, a processing device connected to a wireless modem, an in-vehicle device, a drone, a wearable device, a terminal device in the Internet of Things, a household appliance, a virtual reality device, a terminal device in a future 5G network, a terminal device in a future evolved public land mobile network (PLMN), and the like.

The access network device 102 may be a device that communicates with the terminal device 101. The access network device may provide communication coverage for a specific geographic area, and may communicate with a terminal device within the covered area (a cell). The access network device 102 may communicate with any quantity of terminal devices. There may be a plurality of air interface connections between the access network device 102 and the terminal device 101. For example, there are two air interface connections between the access network device 102 and the terminal device 101, and the two air interface connections are respectively used to transmit a data flow A and a data flow B. The access network device may support communications protocols in different standards, or may support different communication modes. For example, the access network device 102 may be a NodeB, or an evolved NodeB (eNodeB), a Wireless Fidelity access point (WiFi AP), a Worldwide Interoperability for Microwave Access base station (WiMAX BS), or a radio controller in a cloud radio access network (CRAN), or the network device may be an access network device in the future 5G network or an access network device in the future evolved PLMN, or the like.

The core network may include: a control plane function (CPF) network element, a user plane function (UPF) network element 103, a policy control function (PCF) network element 104, and an NWDA network element 105. The control plane function network element may include: an access management function (AMF) network element 106 and a session management function (SMF) network element 107. By using the access network device 102 and the user plane function network element 103, transmission of user plane data between the terminal device 101 and a data network (DN) 108 may be implemented.

The PCF network element 104 has a policy control decision function, and provides a policy for a network. The NWDA network element 105 is configured for big data learning and analytics. The AMF network element 106 is configured for mobility management, lawful interception, access authorization, authentication, and the like. The SMF network element 107 is configured to implement session and bearer management, address allocation, and the like. The DN 108 is a network used to transmit data. Specifically, the DN 108 may be an Internet Protocol (IP) multimedia subsystem (IMS) server, a packet data network (PDN), or an application server (App server).

It can be understood that in the communications system shown in FIG. 1, functions of various composition network elements are merely an example. When the various composition network elements are applied to the embodiments of the present disclosure, not all the functions are necessarily needed.

"And/or" in the embodiments of the present disclosure describes only an association relationship for describing associated objects and represents that three relationships may exist. For example, A and/or B may represent the following three cases: Only A exists, both A and B exist, and only B exists. In addition, in the descriptions of the present disclosure, "a plurality of" means two or more than two.

In the embodiments of the present disclosure, that a network element (such as an A network element) obtains information from another network element (such as a B network element) may mean that the A network element directly receives the information from the B network element, or may mean that the A network element receives the information from the B network element by using another network element (such as a C network element). When the A network element receives the information from the B network element by using the C network element, the C network element may transparently transmit the information, or may process the information. For example, the C network element carries the information in different messages for transmission or screens the information, and only sends screened information to the A network element. Similarly, in various embodiments of the present disclosure, that the A network element sends information to the B network element may mean that the A network element directly sends the information to the B network element, or may mean that the A network element sends the information to the B network element by using another network element (such as the C network element).

Figure 2:
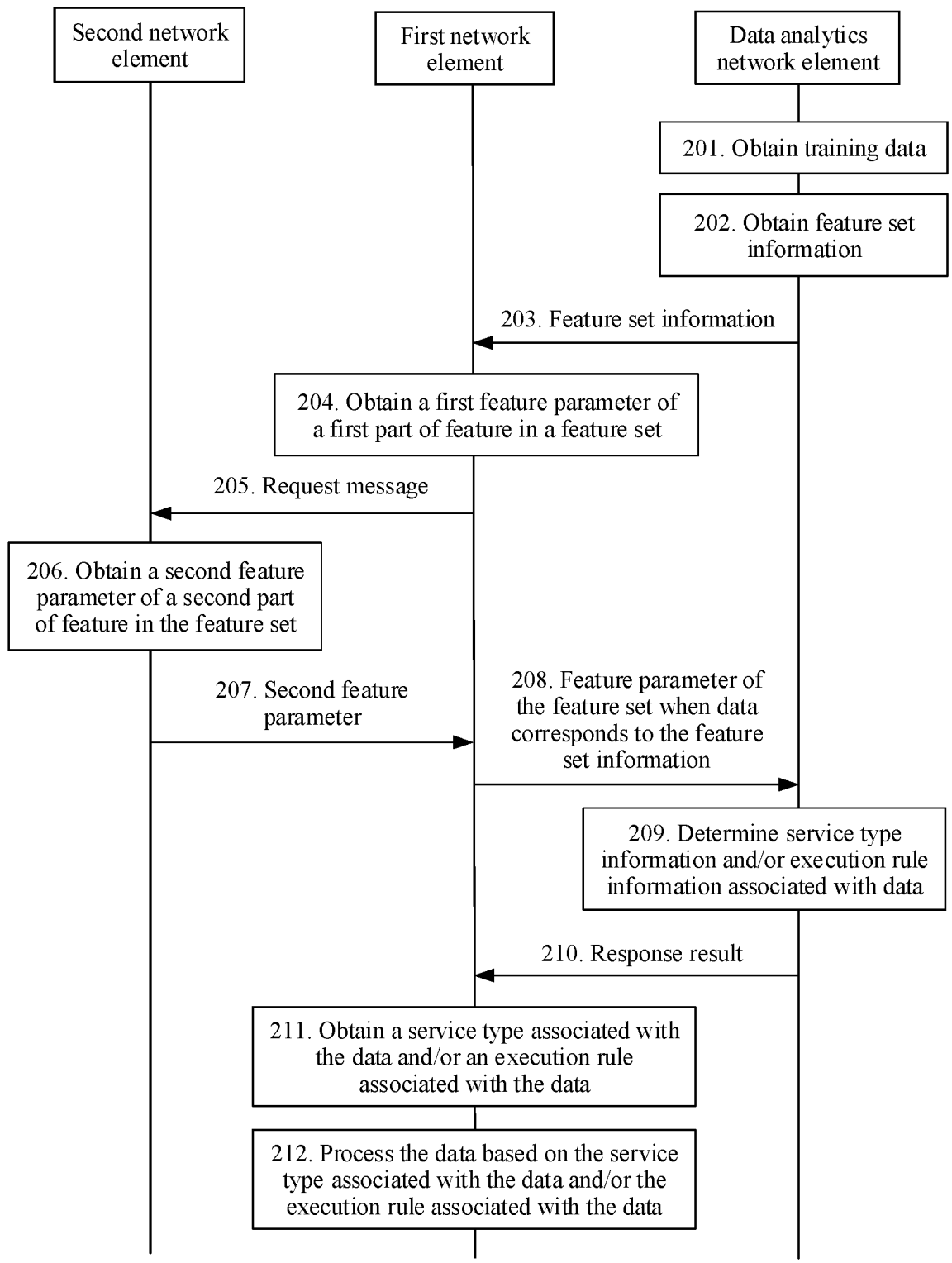
FIG. 2 is a schematic flowchart of a feature parameter obtaining method according to a first embodiment of the present disclosure.

FIG. 2 is a schematic flowchart of a feature parameter obtaining method according to a first embodiment of the present disclosure. The method includes the following operations.

Operation 201: A data analytics network element obtains training data.

The data analytics network element may be the NWDA network element in FIG. 1. The data analytics network element may alternatively be another network element having a network data analytics function. This is not limited herein.

The data analytics network element may obtain the training data separately from other network elements, or the data analytics network element may obtain the training data from a same network element set. Specifically, the other network elements may be telecommunication network devices, or may be third party servers. The telecommunication network device may be at least one of the following devices: a terminal device, an access network device, a control plane function network element (such as an AMF network element or an SMF network element), a UPF network element, a PCF network element, a network management network element (such as a business support system (BSS), an operation support system (OSS), or a management support system (MSS)), a unified data management (UDM)) network element, and an IMS network element. The third party server may be at least one of an app server, an OTT (over the top) server, and a vertical industry control and management center.

The data analytics network element may directly obtain the training data by exchanging data with another network element. Alternatively, the data analytics network element may indirectly obtain the training data by using another network element. For example, the data analytics network element obtains data from the third party server by using a network exposure function (NEF) network element.

The data analytics network element may obtain the training data from another network element in real time, or the data analytics network element may obtain the training data when the data analytics network element and/or another network element are/is idle.

The training data obtained by the data analytics network element may be original data. The training data obtained by the data analytics network element may alternatively be data pre-processed by another network element. For example, to protect user privacy, an application server cleans off sensitive information in original data, and sends processed data to the data analytics network element.

The training data obtained by the data analytics network element may be network data, such as an address of a terminal device, a cell identifier (cell ID), time information, or a network congestion status. The training data obtained by the data analytics network element may alternatively be application data, such as an IP 5-tuple, a user plane data size, a user plane data interval, a service type, service experience, or an extended field. The data analytics network element may further associate the obtained application data with the network data, and obtain associated training data. For example, the data analytics network element associates the application data with the network data based on an address of a terminal device and/or time information. The address of the terminal device may be an IP address, or may be an Ethernet address.

The data analytics network element may obtain the training data at a granularity of service types. For example, the data analytics network element separately obtains training data of a video service, training data of a payment service or training data of a voice over long term evolution (VoLTE) service.

Alternatively, the data analytics network element may obtain the training data at a granularity of network elements. For example, training data obtained from a terminal device may include: a terminal type, an address of the terminal device, a version of an operating system, temperature of the terminal device, a battery level of the terminal device, cell radio channel quality measured by the terminal device, or the like. Training data obtained from a session management network element may include: an identifier (ID) of the session management network element, an address of a terminal device, a data network name (DNN), or the like. Training data obtained from a user plane function network element may include: a user plane function network element ID, a tunnel end point identifier (TEID), a congestion level, an IP 5-tuple, a user plane data size, a quantity of pieces of user plane data, or the like. Training data obtained from an access network device may include: a cell identifier, a quality of service (QoS) parameter, real-time radio channel quality (such as reference signal received power (RSRP), reference signal received quality (RSRQ), a signal to interference plus noise ratio (SINR)), a service handover threshold, a filtering coefficient, an antenna tilt, a carrier frequency, a carrier, a packet loss rate, a guaranteed bit rate (GBR), a maximum bit rate (MBR), a congestion level, or the like. Training data obtained from a third party server may include: an IP 5-tuple, a start time, an end time, a service type, or the like.

Operation 202. The data analytics network element analyzes the training data and obtains feature set information.

The data analytics network element analyzes, by using a big data analytics method, the training data obtained in operation 201, to obtain at least one piece of feature set information. The feature set information may be a specific feature set, or information corresponding to a feature set, for example, an index of the feature set. Each of the at least one piece of feature set information corresponds to at least one service type or at least one execution rule. The execution rule may be at least one of an enforcement policy, a control policy, a charging policy, and a policy and charging control (PCC) rule. The PCC rule may include a quality of service policy.

The data analytics network element analyzes training data of each service type, to obtain feature set information corresponding to each service type. One service type may correspond to one piece of feature set information uniquely or a plurality of pieces of feature set information, and one piece of feature set information may correspond to one service type uniquely or a plurality of service types. When one piece of feature set information corresponds to a plurality of service types, a corresponding service type may further be determined based on another condition or feature other than the feature set information.

The data analytics network element may determine execution rule information of the service type based on the service type corresponding to the feature set information, and the execution rule information of the service type is execution rule information corresponding to the feature set information. For example, when the service type is a payment service, a processing priority of the payment service is determined. In the present disclosure, the execution rule information may be a specific execution rule, or information related to an execution rule, for example, information used to obtain the execution rule. The data analytics network element may alternatively determine execution rule information corresponding to the feature set information based on content of the feature set information. For example, the data analytics network element may determine the execution rule corresponding to the feature set based on at least one of radio channel quality, a congestion level, a packet loss rate, and a handover threshold in the feature set. The data analytics network element may determine information related to the execution rule based on the training data, for example, radio channel quality, a congestion level, a packet loss rate, or a handover threshold.

The data analytics network element may obtain a feature of a service granularity. For example, if a size of user plane data corresponding to training data of a specific type of service is a specific value or belongs to a specific range, the data analytics network element can use the size of the user plane data as a feature of this type of service. For another example, if user plane data corresponding to training data of a specific type of service is from a data network with a feature or some features, the data analytics network element can use a name of the data network as another feature of this type of service.

The data analytics network element may obtain a feature of a terminal device granularity. For example, user plane data features of a specific type of service corresponding to terminal devices produced by different vendors may be different. When this type of service on different terminal devices needs to be distinguished, the data analytics network element can use a terminal device type as a feature of this type of service. In one embodiment, the data analytics network element can distinguish a terminal device type from another based on type allocation codes (TAC) in international mobile equipment identities (IMEI). Therefore, the data analytics network element can use an IMEI of a terminal device as a feature. For another example, user plane data features of a specific type of service corresponding to terminal devices with different operating systems may be different. Therefore, the data analytics network element may also use an operating system type of a terminal device as a feature of this type of service.

The data analytics network element may further obtain a feature of a user granularity. For example, if a user is a merchant user, a terminal device owned by the user uses a specific type of service in a fixed geographical range for a long time. Therefore, the data analytics network element can use position information of the terminal device as a feature of this type of service. In one embodiment, the data analytics network element may obtain public IP address information and port number information of the terminal device from an application server. Subsequently, the data analytics network element can query internal IP address information corresponding to the public IP address from a network address translation (NAT) network element. The data analytics network element obtains user identification information, position information, and the like corresponding to the internal IP address information from a network management system.

A video service is used as an example. The data analytics network element can obtain the following feature set by analyzing the training data:

<a terminal device type, an access point name (APN), a time, a size of a first packet in a data flow, an average size of all packets in the data flow, and entropy values of sizes of all the packets in the data flow>.

A payment service is used as an example. The data analytics network element can obtain the following feature set by analyzing the training data:

<a terminal device type, an APN, a cell identifier, a time, an average value of uplink and downlink time intervals of all packets in a data flow, and entropy values of the uplink and downlink time intervals of all the packets in the data flow>.

It should be noted that the feature sets of the video service and the payment service in the present disclosure are merely examples for ease of understanding. The feature sets of the video service and the payment service in the present disclosure may further include other contents, and they are not limited in the present disclosure.

In a possible implementation, the data analytics network element can aggregate feature sets corresponding to various service types, to obtain a total feature set, and set an index for each feature in the total feature set. Based on the total feature set, the data analytics network element can obtain an index of a feature set corresponding to each service. In one embodiment, the data analytics network element may also aggregate feature sets corresponding to some service types, to obtain a total feature set corresponding to the services, and set a feature index for each feature in the feature set.

For example, the data analytics network element can combine the feature sets of the video service and the payment service, to obtain a total feature set shown in Table 1.

TABLE 1

| Feature | Feature index |
|---|---|
| Terminal device type | 1 |
| APN | 2 |
| Cell identifier | 3 |
| Time | 4 |
| Size of a first packet in a data flow | 5 |
| Average size of all packets in the data flow | 6 |
| Entropy values of sizes of all the packets in the data flow | 7 |
| Average value of uplink and downlink time intervals of all the packets in the data flow | 8 |
| Entropy values of uplink and downlink time intervals of all the packets in the data flow | 9 |

Based on Table 1, it can be learned that a feature index set corresponding to the video service is <1, 2, 4, 5, 6, 7>, and a feature index set corresponding to the payment service is <1, 2, 3, 4, 8, 9>.

In another possible implementation, because a feature index corresponding to one feature can be represented by using one binary character, a feature index set corresponding to one service type can be represented by using one binary string. Assuming that a quantity of features in the total feature set is n, a feature set index corresponding to one service type can be represented by using an n-bit binary string. For example, when an $i^{th}$ bit in a binary string corresponding to one service type is 1, it indicates that a feature set corresponding to the service type includes an $i^{th}$ feature in the total feature set. Based on Table 1, using the foregoing video service and the foregoing payment service as examples, a binary string corresponding to the feature index set <1, 2, 4, 5, 6, 7> corresponding to the video service is 110111100, and a binary string corresponding to the feature index set <1, 2, 3, 4, 8, 9> corresponding to the payment service is 111100011.

The data analytics network element may further obtain a matching algorithm corresponding to each piece of feature set information. The matching algorithm may be obtained by training data by using a big data analytics method. For example, the data analytics network element obtains training data of a specific service type, and obtains feature set information and a feature parameter set (for example, an eigenvector) that correspond to the training data of the service type. The data analytics network element obtains, by using a big data analytics method, a matching algorithm corresponding to the feature set information based on the obtained feature parameter set. The data analytics network element may alternatively obtain a matching algorithm corresponding to each piece of feature set information by using a preset method. In one embodiment, the matching algorithm may be a mathematical function or a data model.

In a possible implementation, the data analytics network element associates the matching algorithm with a service type or an execution rule corresponding to the feature set information. The association may be understood as establishing a mapping relationship. An input of the matching algorithm may be a feature parameter set of the data. An output result of the matching algorithm is whether the feature parameter set conforms to the matching algorithm. A service type associated with the data corresponding to the input feature parameter set can be determined based on the output result and a service type associated with the matching algorithm. For example, if the output result of the matching algorithm is 1, it indicates that the input feature parameter set conforms to the matching algorithm, and the service type associated with the matching algorithm is the service type associated with the data; and if the output result of the matching algorithm is 0, it indicates that the input feature parameter set does not conform to the matching algorithm, and the service type associated with the matching algorithm is not the service type associated with the data.

In another possible implementation, the data analytics network element associates an output result of the matching algorithm with a service type or an execution rule. The association may be understood as establishing a mapping relationship. For example, an output result 0 corresponds to a first service type or a first execution rule, an output result 1 corresponds to a second service type or a second execution rule, and output results 2 to 4 correspond to a third service type or a third execution rule. An input of the matching algorithm may be a feature parameter set of the data, and a service type or an execution rule associated with the data can be determined based on the output result of the matching algorithm. In this scenario, the output result of the matching algorithm may be service type information or execution rule information.

Operation 203: The data analytics network element sends the feature set information to a first network element.

The first network element may be a user plane data processing network element, for example, the UPF network element in FIG. 1, or may be an access network device. The first network element may alternatively be another network element having a user plane data processing function. Certainly, the first network element may alternatively be a control plane data processing network element. This is not limited herein. In this embodiment of the present disclosure, an example in which the first network element is a UPF network element is used for description.

In this embodiment of the present disclosure, the data analytics network element sends at least some feature set information to the first network element by using a policy control network element (for example, the PCF network element in FIG. 1) and a session management network element (for example, the SMF network element in FIG. 1). The data analytics network element alternatively sends at least one piece of feature set information to the first network element by using a session management network element through a service-based interface.

The data analytics network element can send feature set information corresponding to a plurality of service types to the first network element together or separately. The data analytics network element may send the feature set information to the first network element actively, or send the feature set information at the request of the first network element. The data analytics network element may send the feature set information to the first network element in real time, or send the feature set information to the first network element when a network is idle. This is not limited herein. In one embodiment, the data analytics network element sends the feature set information to the first network element in a packet data unit (PDU) session establishment/modification process.

In a possible implementation, the data analytics network element may select, based on a partial feature, partial feature set information from the feature set information pre-obtained in operation 202, then send the selected partial feature set information to the first network element as the foregoing at least one piece of feature set information. The partial feature may be a specific feature or some features in the feature set, or may be a feature that is not in the feature set but is associated with the feature set. For example, the partial feature may be a DNN and/or identification information of a UPF network element corresponding to a data network. For example, the data analytics network element may receive a message from the session management network element, where the message includes the DNN and/or the identification information of the UPF network element, and the data analytics network element selects, from the pre-obtained feature set information, feature set information that confirms to the DNN and/or the identification information of the UPF network element.

The data analytics network element may alternatively send, to the first network element, information about the partial feature associated with the feature set information. The partial feature may be a specific feature or some features in the feature set, or may be a feature that is not in the feature set but is associated with the feature set. For example, the partial feature may be a DNN and/or identification information of a UPF network element corresponding to a data network, may be address information of a server on which the service is deployed, or may be IP 5-tuple information. The information about the partial feature may be sent to the first network element together with the associated feature set information. Alternatively, the information about the partial feature and the feature set information may be sent to the first network element separately.

The data analytics network element may further send, to the first network element, service type information corresponding to the at least one piece of feature set information. The service type information may be a service type or indication information of a service type, for example, at least one of a sequence number of the service type, a sequence number corresponding to the feature set information, and the output result of the matching algorithm. The service type information may be included in the corresponding feature set and sent to the first network element, or the service type information may be sent to the first network element independently.

The data analytics network element may further send, to the first network element, execution rule information corresponding to the at least one piece of feature set information. The execution rule information may be information about a feature related to an execution rule, may be a specific execution rule, or may be indication information of an execution rule, for example, a sequence number of the execution rule. This is not limited herein.

Table 2 is used as an example to describe content sent to the first network element by the data analytics network element.

In Table 2, the feature set information is a feature index set, feature index sets are numbered, and one feature index set corresponds to one service type. The service type information is a sequence number of the service type. The execution rule information is a feature related to the execution rule, and the feature related to the execution rule is a radio channel quality handover threshold for the service. The partial feature associated with the service type or the feature index set is a network name. The data analytics network element may send the feature index set in Table 2 only to the first network element. The data analytics network element may alternatively send at least one of the sequence number, the service type, the handover threshold and the network name to the first network element.

TABLE 2

| Sequence number | Service type | Handover threshold | Network name | Feature index set |
|---|---|---|---|---|
| 1 | Service type-1 | Handover threshold 1 | DNN-1 | {index 1, index 2, index 3, . . ., index 8} |
| 2 | Service type-2 | Handover threshold 2 | DNN-1 | {index 1, index 3, index 5, . . ., index 99} |
| 3 | Service type-3 | Handover threshold 2 | DNN-2 | {index 1, index 4, index 7, . . ., index 19} |
| 4 | Service type-4 | Handover threshold 2 | DNN-2 | {index 1, index 2, index 3, . . ., index 1000} |
| 5 | Service type-5 | Handover threshold 1 | DNN-3 | {index 1, index 2, index 3, . . ., index 200} |

Operation 204: The first network element receives data, and obtains, based on the received data and the feature set information, a first feature parameter of a first part of feature when the data corresponds to the first part of feature in the feature set.

In this embodiment of the present disclosure, the data received by the first network element may be user plane data, for example, a packet. Certainly, the first network element may alternatively receive control plane data. The data may be uplink data or downlink data. This is not limited herein. In the embodiments of the present disclosure, an example in which the received data is the user plane data is used for description.

In a possible implementation, when receiving a plurality of pieces of feature set information, the first network element may select partial feature set information from the received feature set information based on a partial feature. The partial feature may be a feature in the feature set, or may be a feature that is not in the feature set but is associated with the feature set. For example, the partial feature may be IP 5-tuple information. The first network element obtains feature set information and IP 5-tuple information corresponding to the feature set information from the data analytics network element. Specifically, the partial feature may be an IP address and/or a port number. The first network element selects, from the received feature set information, a feature set information in which an IP address and/or a port number are consistent with an IP address and/or a port number corresponding to the user plane data.

If the first network element receives a feature set, after receiving the data, the first network element obtains a feature parameter corresponding to the data based on the received feature set. If the first network element receives feature set related information (for example, a feature index set), the first network element determines a corresponding feature set based on the feature set information, and obtains a feature parameter of the data. Certainly, alternatively, the first network element may directly obtain a corresponding feature parameter based on feature set related information, for example, obtaining a feature parameter corresponding to a feature index based on the feature index.

In the embodiments of the present disclosure, the feature set corresponding to the feature set information includes the first part of feature and a second part of feature. The first part of feature is a feature that the first network element can obtain from itself. The second part of feature is a feature that the first network element needs to obtain from a second network element. For example, the second part of feature is a feature that cannot be obtained by the first network element but can be obtained by the second network element. The first part of feature can include at least one feature. The second part of feature includes at least one feature. In one embodiment, the second part of feature includes at least one of a type of a terminal device corresponding to the data, identification information of a cell in which the terminal device is located and signal quality of the cell in which the terminal device is located. In the embodiments of the present disclosure, that the feature set includes the first part of feature and the second part of feature is merely an example for description. The feature set may further include a third partial feature, and the third partial feature is a feature that the first network element needs to obtain from a third network element. The rest can be deduced by analogy. When the first network element needs to obtain a feature in the feature set from an $N^{th}$ network element (N is an integer greater than 3), the feature set may further include an $N^{th}$ partial feature, and details are not described herein again.

An example in which the first network element is the UPF network element and the data is data of a video service is used below for description.

When the data is the data of the video service, the UPF network element learns of, through analysis, the following four features in the feature set: a time, a size of a first packet in a data flow, an average size of all packets in the data flow and entropy values of sizes of all the packets in the data flow. That is, the four features are first part of features in the feature set corresponding to the video service. Other features such as a terminal device type and an APN need to be obtained from the AMF network element and the SMF network element, that is, the two features are second part of features in the feature set corresponding to the video service.

In the embodiments of the present disclosure, for ease of description, the second part of features are collectively referred to as a feature that the first network element needs to obtain from the second network element. Correspondingly, the second network element is no longer limited to one network element or one type of network elements, that is, there may be one second network element or a plurality of second network elements. The second network elements may be a plurality of network elements of different types, or a plurality of network elements of a same type. For example, when the first network element is a UPF network element, the second network element may be at least one of an SMF network element, an AMF network element and an access network device.

In a possible implementation, feature engineering (for example, a feature extraction unit) is deployed in the first network element, and the first network element obtains a feature parameter corresponding to data by using feature engineering. Specifically, the first network element obtains, through analysis, the feature, that is, the first part of feature, that is in the feature set and that can be obtained by the first network element itself, first part of feature and obtains the first feature parameter of the first part of feature when data corresponds to the first part of feature. The first feature parameter may be an actual value that is of the data and that corresponds to the feature, or may be a processed value, for example, a normalized value or a quantized value. In the present disclosure, the feature parameter may alternatively be specific content of the feature, and is not necessarily a specific value, for example, a DNN or a terminal type. The first feature parameter may be presented in a form of a set, for example, in a form of a list or an eigenvector. In one embodiment, the first network element may denote the second feature parameter corresponding to the feature (that is, the second part of feature) that needs to be obtained from the second network element second part of feature as Null. A feature parameter corresponding to a feature that the first network element does not need to obtain is denoted as NA.

An example in which the first network element is the UPF network element and the data is data of a video service is used below for description.

A feature index set of the video service received by the UPF network element is 110111100. The UPF network element can learn, based on a deployed total feature list, that the feature set corresponding to the video service is <a terminal device type, an APN, a time, a size of a first packet in a data flow, an average size of all packets in the data flow, entropy values of sizes of all the packets in the data flow>. The UPF network element learns, through analysis, that the four features in the feature set, namely, the time, the size of the first packet in the data flow, the average size of all packets in the data flow and the entropy values of the sizes of all the packets in the data flow, that is, first part of features in the feature set corresponding to the video service, may be obtained by the UPF network element itself. The UPF network element can obtain feature parameters corresponding to the four features as 0.625, 0.1, 0.25, and 0.5. The four feature parameters are normalized feature parameters.

Correspondingly, because the UPF network element learns, through analysis, that the terminal device type in the feature set needs to be obtained from the AMF network element, and the APN needs to be obtained from the session management network element, the two features are the second part of features in the feature set. The UPF network element can denote the terminal device type and the APN as Null. The UPF network element learns, through analysis, that the cell identifier, the average value of uplink and downlink time intervals of all packets in the data flow and the entropy values of uplink and downlink time intervals of all packets in the data flow in the feature set are features that do not need to be obtained, and the UPF network element can denote the three features as NA. In one embodiment, the UPF network element can generate a first eigenvector <Null, Null, NA, 0.625, 0.1, 0.5, 0.25, NA, NA> corresponding to the feature set.

Operation 205: The first network element sends a request message to at least one second network element, where the request message is used to request a second feature parameter of the second part of feature when the data corresponds to the second part of feature in the feature set.

The first network element learns of, through analysis, the feature (that is, the second part of feature) that is in the feature set and that needs to be obtained from at least one second network element second part of feature, and sends the request message to the corresponding second network element, to request the second feature parameter of the second part of feature when the data corresponds to the second part of feature in the feature set.

In a possible implementation, the request message includes at least one of identification information of a terminal device corresponding to the data, address information of the terminal device and the feature set information. Certainly, the first network element can further sends at least one of the identification information of the terminal device corresponding to the data, the address information of the terminal device and the feature set information to the second network element by using another message.

In a possible implementation, when a plurality of second network elements are used, the request message may be sent, by the first network element, to the plurality of second network elements separately, or the request message may be sent, by one of the plurality of second network elements, to the other second network elements.

An example in which the first network element is the UPF network element and the data is data of a video service is used below for description.

The UPF network element learns, through analysis, that the terminal device type in the feature set needs to be obtained from the AMF network element, then the UPF network element sends the request message to the AMF network element, to request the terminal device type corresponding to the data. Specifically, the UPF network element can send the request message to the AMF network element by using the SMF network element.

The UPF network element learns, through analysis, that the APN in the feature set needs to be obtained from the session management network element, then the UPF network element sends the request message to the SMF network element, to request the APN corresponding to the data.

Operation 206: The at least one second network element receives the request message, and obtains the second feature parameter of the second part of feature when the data corresponds to the second part of feature in the feature set.

In a possible implementation, feature engineering (for example, a feature extraction) is deployed in the second network element, and the second network element obtains the feature parameter corresponding to the data by using feature engineering. In the embodiments of the present disclosure, feature engineering can be deployed in both of the first network element and the second network element, that is, a distributed method is used in feature engineering. The total feature list can be synchronized between the first network element, the second network element and the data analytics network element.

After receiving the request message, the second network element obtains, through analysis, the feature, that is, the second part of feature, that is in the feature set and that can be obtained by the second network element itself, second part of feature and obtains the second feature parameter of the second part of feature when the data corresponds to the second part of feature. An obtaining method for the second feature parameter and content of the second feature parameter are similar to those of the first feature parameter. For details, refer to description of the first feature parameter in operation 204, and details are not described herein again. In one embodiment, the second network element can denote the feature parameter corresponding to the feature that needs to be obtained from the another network element as Null. A feature parameter corresponding to a feature that the second network element does not need to obtain is denoted as NA.

Specifically, the second network element can obtain, based on information of the terminal device corresponding to the data, the second feature parameter of the second part of feature when the data corresponds to the second part of feature. The information of the terminal device may be the identification information of the terminal device and/or the address information of the terminal device.

In a possible implementation, when a plurality of second network elements are used, different second network elements may receive the request message separately, and obtain the corresponding feature parameter separately.

After obtaining the second feature parameter, the second network element sends the obtained second feature parameter to the first network element.

An example in which the second network elements are the AMF network element and the SMF network element, and the data is data of a video service is used below for description.

A feature index set of the video service that is received by the SMF network element is 110111100. The SMF network element can learn, based on a deployed total feature list, that the feature set corresponding to the video service is <a terminal device type, an APN, a time, a size of a first packet in a data flow, an average size of all packets in the data flow, entropy values of sizes of all the packets in the data flow>. The SMF network element learns, through analysis, that the APN in the feature set is the feature that may be obtained by the SMF network element itself. The SMF network element can obtain the APN, for example, an IMS APN, based on the identification information of the terminal device and/or the address information of the terminal device. Correspondingly, the SMF network element can further learns, through analysis, that the terminal device type, the time, the size of the first packet in the data flow, the average size of all packets in the data flow and the entropy values of the sizes of all packets in the data flow in the feature set need to be obtained from another network element, then the SMF network element denotes the five features as Null. The SMF network element may further learn, through analysis, that the cell identifier, the average value of uplink and downlink time intervals of all packets in the data flow and the entropy values of uplink and downlink time intervals of all packets in the data flow in the feature set are features that do not need to be obtained, then the SMF network element can denote the three features as NA. In one embodiment, the SMF network element can generate a second eigenvector <Null, IMS APN, NA, Null, Null, Null, NA, NA> corresponding to the feature set. In one embodiment, the SMF network element may further obtain a normalized value of the IMS APN, for example, 1, then the second eigenvector may be <Null, 1, NA, Null, Null, Null, NA, NA>.

The AMF network element can receive, from the SMF network element, a feature index set corresponding to the video service, that is, 110111100. The AMF network element can learn, based on a deployed total feature list, that the feature set corresponding to the video service is <a terminal device type, an APN, a time, a size of a first packet in a data flow, an average size of all packets in the data flow, entropy values of sizes of all the packets in the data flow>. The AMF network element learns, through analysis, that the terminal device type in the feature set is the feature that can be obtained by the AMF network element itself. The AMF network element can obtain the terminal device type, for example, iPhone 7, based on the identification information of the terminal device and/or the address information of the terminal device. Correspondingly, the AMF network element can further learns, through analysis, that the APN, the time, the size of the first packet in the data flow, the average size of all packets in the data flow and the entropy values of the sizes of all packets in the data flow in the feature set need to be obtained from another network element, then the AMF network element denotes the five features as Null. The AMF network element may further learn, through analysis, that the cell identifier, the average value of uplink and downlink time intervals of all packets in the data flow and the entropy values of uplink and downlink time intervals of all packets in the data flow in the feature set are features that do not need to be obtained, then the AMF network element denotes the three features as NA. In one embodiment, the AMF network element can generate a third eigenvector <iPhone 7, Null, NA, Null, Null, Null, NA, NA> corresponding to the feature set. In one embodiment, the AMF network element may further obtain a normalized value of iPhone 7, for example, 0.9, then the third eigenvector may be <0.9, Null, NA, Null, Null, Null, NA, NA>.

Operation 207: The at least one second network element sends the second feature parameter to the first network element.

According to the description of operation 206, after obtaining the second feature parameter, the second network element sends the obtained second feature parameter to the first network element. For example, the SMF network element sends the second eigenvector to the UPF network element, and the AMF network element sends the third eigenvector to the UPF network element.

In a possible implementation, when a plurality of second network elements are used, the second network elements may send the second feature parameter to the first network element separately.

Operation 208: The first network element sends, based on the first feature parameter and the second feature parameter, the feature parameter of the feature set when the data corresponds to the feature set information to the data analytics network element.

After receiving the second feature parameter from the at least one second network element, the first network element can generate, based on the first feature parameter and the second feature parameter, the feature parameter of the feature set when the data corresponds to the feature set information. In one embodiment, the feature parameter of the feature set when the data corresponds to the feature set information may be an eigenvector.

After obtaining the feature parameter of the feature set when the data corresponds to the feature set information, the first network element sends the feature parameter of the feature set when the data corresponds to the feature set information to the data analytics network element. For ease of description, the feature parameter sent to the data analytics network element by the first network element is referred to as the third feature parameter.

In one embodiment, the user plane data processing network element may further send, to the data analytics network element, association information of an eigenvalue set, for example, a sequence number of the feature set information (the sequence number in Table 2).

An example in which the first network element is the UPF network element and the data is data of a video service is used below for description.

After integrating the obtained first eigenvector <Null, Null, NA, 0.625, 0.1, 0.5, 0.25, NA, NA>, the second eigenvector <Null, 1, NA, Null, Null, Null, NA, NA> and the third eigenvector <0.9, Null, NA, Null, Null, Null, NA, NA>, the UPF network element obtains a total eigenvector <0.9, 1, NA, 0.625, 0.1, 0.5, 0.25, NA, NA> of the feature set when the data corresponds to the feature set.

The UPF network element can send the total eigenvector to the data analytics network element by using the session management network element and a policy control network element. The UPF network element may further send the total eigenvector to the data analytics network element by using the session management network element and a service-based interface between the session management network element and the data analytics network element.

Operation 209: The data analytics network element determines, based on the third feature parameter, service type information and/or execution rule information associated with the data.

After receiving the third feature parameter, the data analytics network element determines, based on the third feature parameter and the matching algorithm obtained in operation 202, the service type information or the execution rule information associated with the data. The service type information may be a specific service type, or indication information of the service type. For details, refer to operation 203. The execution rule information may be a specific execution rule, or a feature related to the execution rule. For details, refer to operation 203.

In one embodiment, referring to operation 202, the data analytics network element may further determine the execution rule information corresponding to the user plane data based on the service type information associated with the data.

Operation 210: The data analytics network element sends a response result for the third feature parameter to the first network element.

In a possible implementation, the response result may include the service type information and/or execution rule information of the data.

When the first network element is the UPF network element, the data analytics network element can send the response result to the UPF network element by using the policy control network element and the session management network element. The data analytics network element may further send the response result to the UPF network element by using the session management network element by using the service-based interface.

The response result may include the service type associated with the data, for example, the service type associated with the data that is determined by the data analytics network element in operation 209; or the response result may include the indication information of the service type associated with the data, for example, the sequence number of the feature index set or a sequence number of the service type; or the response result may include the third feature parameter corresponding to the service type associated with the data. In one embodiment, the response result may further include whether the third feature parameter conforms to a determined result of a corresponding matching algorithm.

In one embodiment, referring to operation 203, after receiving the response result, the policy control network element can generate, based on the response result, the corresponding execution rule information for the service type associated with the data. Then the policy control network element sends the generated execution rule information to the UPF network element.

In one embodiment, the response result may further include the execution rule information corresponding to the data. The data analytics network element may determine the execution rule information corresponding to the data based on the service type information associated with the data. For details, refer to operation 202.

Operation 211: The first network element obtains the response result from the data analytics network element, and obtains, based on the response result, a service type associated with the data and/or an execution rule associated with the data.

When the first network element is the UPF network element, the UPF network element can receive the response result from the data analytics network element by using the policy control network element and the session management network element. If the response result includes the service type, the received service type is determined as the service type associated with the data; and if the response result includes the indication information of the service type, the service type associated with the data is obtained based on the indication information.

The first network element can obtain, based on the service type information associated with the data, the execution rule associated with the data. The first network element may further obtain, based on the response result, the execution rule associated with the data from the policy control network element, for example, the first network element obtains the execution rule from the policy control network element based on the service type information included in the response result. Alternatively, the first network element may directly obtain the execution rule associated with the data from the response result.

Operation 212: The first network element processes the data based on the service type associated with the data and/or the execution rule associated with the data.

In a possible implementation, the first network element processes the data based on the service type associated with the data. For example, the first network element adds label information of the service type to the data based on the service type associated with the data; or the first network element forwards the data based on service priority information and the service type associated with the data; or the first network element adds scheduling priority information to the data based on the service type associated with the data; or the first network element determines that a destination address of the data is an address of the terminal device and the terminal device is in an idle state, and sends paging priority information of the terminal device to the session management network element based on the service type associated with the data; or the first network element performs charging statistics on the data based on the service type associated with the data.

In another possible implementation, the first network element processes the data based on the execution rule associated with the data. For example, the first network element forwards the data based on service priority information indicated by the execution rule; or the first network element adds label information of the service type to the data based on the execution rule; or the first network element adds scheduling priority information to the data based on the execution rule; or the first network element determines that a destination address of the data is an address of the terminal device and the terminal device is in an idle state, and sends paging priority information of the terminal device to the session management network element based on the execution rule; or the first network element performs charging statistics on the data based on the execution rule associated with the data.

In this embodiment, the first network element obtains the feature set information from the data analytics network element. The first network element obtains the first feature parameter of the first part of feature when data corresponds to the first part of feature in the feature set, and request, from the at least one second network element, the second feature parameter of the second part of feature when the data corresponds to the second part of feature in the feature set, and sends, based on the first feature parameter and the second feature parameter, the feature parameter of the feature set when the data corresponds to the feature set information to the data analytics network element. Because the first network element can obtain the feature parameter of the feature set when the data corresponds to the feature set from another network element, features in the feature set are not limited to features that the first network element can obtain. Therefore, features in the feature set can be more comprehensive, so that a feature parameter fed back by the first network element is more accurate. Further, the first network element obtains, from another network element, the feature parameter of the feature set when the data corresponds to the feature set, to optimize network resources and improve network resource efficiency.

Figure 3:
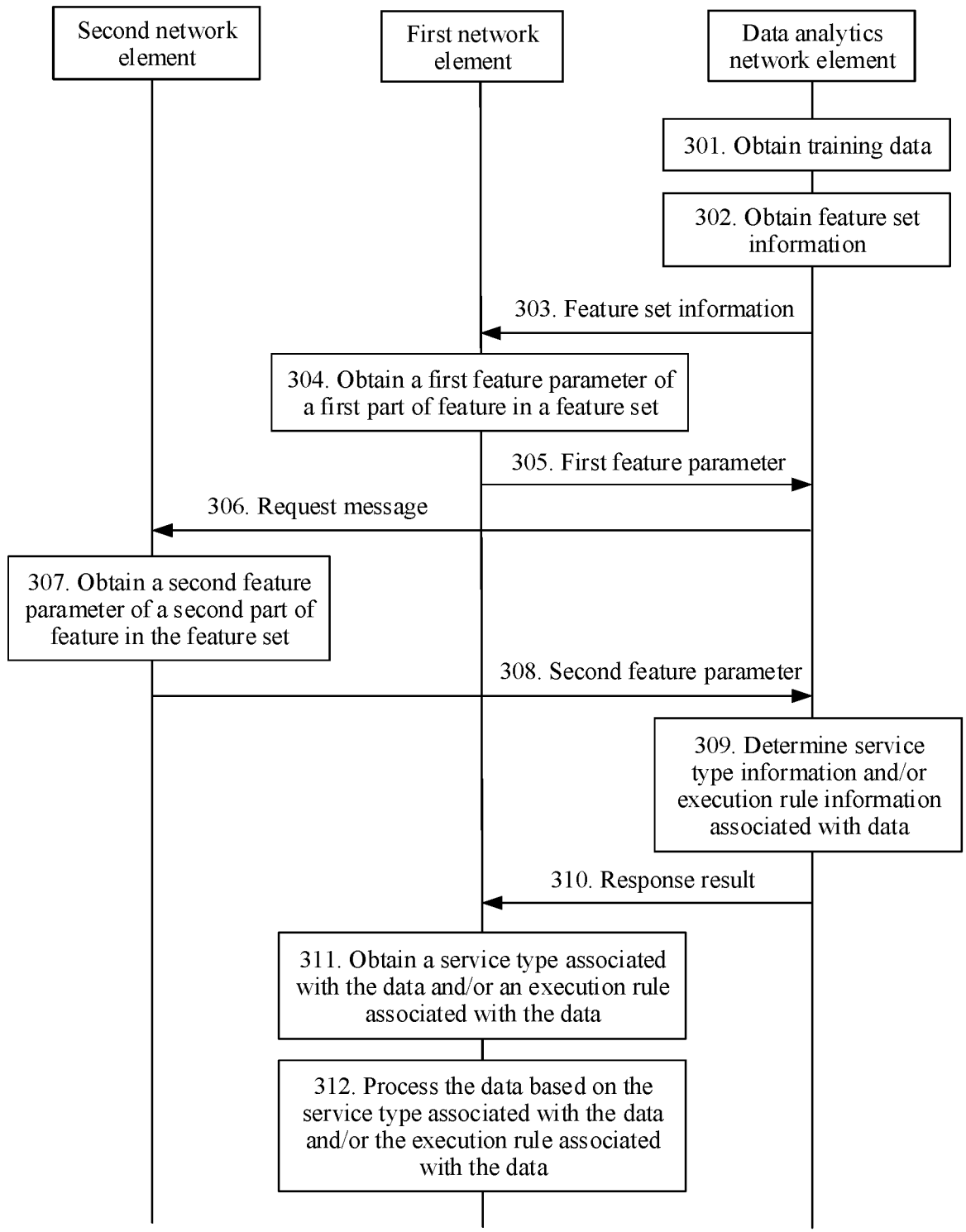
FIG. 3 is a schematic flowchart of a feature parameter obtaining method according to a second embodiment of the present disclosure.

FIG. 3 is a schematic flowchart of a feature parameter obtaining method according to a second embodiment of the present disclosure. For a part in this embodiment that is the same as that in the first embodiment, refer to description of the first embodiment. The method in this embodiment includes the following operations.

Operations 301 to 303: For details, refer to operations 201 to 203. Details are not described herein again.

Operation 304: The first network element receives data, and obtains, based on the received data and the feature set information, a first feature parameter of the first part of feature when data corresponds to a first part of feature in the feature set.

In this operation, the first network element only needs to obtain a feature parameter corresponding to a feature that can be obtained by the first network element, that is, the first feature parameter of the first part of feature when data corresponds to the first part of feature in the feature set. For a specific obtaining method, refer to description of operation 204.

An example in which the first network element is the UPF network element and the data is data of a video service is used below for description.

A feature index set of the video service that is received by the UPF network element is 110111100. The UPF network element can learn, based on a deployed total feature list, that the feature set corresponding to the video service is <a terminal device type, an APN, a time, a size of a first packet in a data flow, an average size of all packets in the data flow, entropy values of sizes of all the packets in the data flow>. The UPF network element learns, through analysis, that the following features in the feature set, namely, the time, the size of the first packet in the data flow, the average size of all packets in the data flow and the entropy values of the sizes of all the packets in the data flow, that is, first part of features in the feature set corresponding to the video service, can be obtained by the UPF network element itself. The UPF network element can obtain feature parameters corresponding to the four features as 0.625, 0.1, 0.25, and 0.5. The four feature parameters are normalized feature parameters.

Operation 305: The first network element sends the first feature parameter to the data analytics network element.

Specifically, if the first network element is the UPF network element, the UPF network element can send the first feature parameter to the data analytics network element through the SMF network element and the PCF network element. In one embodiment, the UPF network element may further send the first feature parameter to the data analytics network element by using the SMF network element and a service-based interface between the SMF network element and the data analytics network element.

In a possible implementation, the first network element may further send, to the data analytics network element, at least one of identification information of a terminal device corresponding to the data, address information of the terminal device and the feature set information. The first network element may further send a first message to the data analytics network element, and the first message is used to request the data analytics network element to determine the service type of the data. In one embodiment, the first message may include at least one of the first feature parameter, the identification information of the terminal device, the address information of the terminal device and the feature set information.

The first network element may further send, to the data analytics network element, association information of the first feature parameter, for example, the sequence number of the feature set information.

Operation 306: The data analytics network element sends a second message to the at least one second network element, where the second message is used to request a second feature parameter of the second part of feature when the data corresponds to the second part of feature in the feature set.

The second part of feature is a feature, in the feature set, that the data analytics network element needs to obtain from the second network element.

In a possible implementation, after receiving the first feature parameter from the first network element, the data analytics network element determines to send the second message to the second network element. Specifically, the data analytics network element can determine, based on the feature set information, that the second message needs to be sent to the second network element. For example, the data analytics network element learns, by comparing the first feature parameter with a feature in the feature set, that received first feature parameters are incomplete. Therefore, the data analytics network element needs to send the second message to the second network element.

The second message may include at least one of identification information of the terminal device corresponding to the data, address information of the terminal device and the feature set information.

The at least one second network element may be a plurality of network elements with different types, or a plurality of network elements with a same type, and this is not limited in this embodiment of the present disclosure. When there are a plurality of second network elements, the data analytics network element can send the second message to the second network elements separately. The data analytics network element can send the second message to the second network element directly or by using another network element or interface. This is not limited herein.

In a possible implementation, the data analytics network element can determine a corresponding second network element based on a type of the second part of feature in the feature set. For example, if the second part of feature includes the terminal device type, the second network element corresponding to this feature may be the AMF network element; if the second part of feature includes a reference signal received power, the second network element corresponding to this feature may be the access network device; and if the second part of feature includes a data network name, the second network element corresponding to this feature may be the SMF network element.

The data analytics network element can send a third message to the policy control network element, and the third message is used to query a second network element registered by the terminal device corresponding to the data. The second message may include the identification information of the terminal device corresponding to the data and/or the address information of the terminal device. The data analytics network element receives a response from the policy control network element, and the response includes information of the second network element registered by the terminal device, for example, an identifier of the second network element registered by the terminal device. The data analytics network element obtains the second feature parameter corresponding to the second part of feature from the second network element registered by the terminal device. For example, if the data analytics network element determines that a data network name corresponding to the data needs to be obtained from the SMF network element, the data analytics network element sends a third message to the PCF network element. The data analytics network element receives an identifier that is of the SMF network element registered by the terminal device and from the PCF network element. Subsequently, the data analytics network element obtains the data network name corresponding to the data from the SMF network element registered by the terminal device.

An example in which the data is data of a video service is used below for description.

After receiving the first feature parameter, the data analytics network element determines that the second feature parameter needs to be obtained from the second network element. Specifically, because the data analytics network element learns, through analysis, that the terminal device type in the feature set obtained by the UPF network element through analysis needs to be obtained from the AMF network element, and the APN needs to be obtained from the session management network element, the two features are the second part of features in the feature set. The data analytics network element may further learn, through analysis, that the cell identifier, the average value of uplink and downlink time intervals of all packets in the data flow and the entropy values of uplink and downlink time intervals of all packets in the data flow in the feature set are features that do not need to be obtained.

The data analytics network element sends a request message to the AMF network element and the SMF network element separately, and the request message may include at least one of identification information of the terminal device corresponding to the data, address information of the terminal device and the feature set information.

Operation 307: The at least one second network element receives the request message, and obtains the second feature parameter of the second part of feature when the data corresponds to the second part of feature in the feature set.

For details of this operation, refer to operation 206.

Operation 308: The at least one second network element sends the second feature parameter to the data analytics network element.

According to the description of operation 307, after obtaining the second feature parameter, the second network element sends the second feature parameter to the data analytics network element.

In a possible implementation, when a plurality of second network elements are used, the second network elements may send the second feature parameter to the data analytics network element separately. In one embodiment, the second network element may further send, to the data analytics network element, association information of the second feature parameter, for example, the sequence number of the feature set information. The second network element can send the second feature parameter to the data analytics network element directly, or send the second feature parameter indirectly by using another network element or interface. This is not limited herein.

Operation 309: The data analytics network element determines, based on the first feature parameter and the second feature parameter, service type information and/or execution rule information associated with the data.

In a possible implementation, after receiving the first feature parameter and the second feature parameter, the data analytics network element can generate, based on the first feature parameter and the second feature parameter, a third feature parameter of the feature set when the data corresponds to the feature set information. In one embodiment, the third feature parameter may be an eigenvector.

An example of video service data is used below for description.

After integrating the obtained first eigenvector <Null, Null, NA, 0.625, 0.1, 0.5, 0.25, NA, NA>, the second eigenvector <Null, 1, NA, Null, Null, Null, NA, NA> and the third eigenvector <0.9, Null, NA, Null, Null, Null, NA, NA>, the data analytics network element obtains a total eigenvector <0.9, 1, NA, 0.625, 0.1, 0.5, 0.25, NA, NA> of the feature set when the data corresponds to the feature set.

The data analytics network element determines, based on the third feature parameter and the matching algorithm obtained in operation 302, the service type information or the execution rule information associated with the data. The service type information may be a specific service type, or indication information of the service type. For details, refer to operation 303. The execution rule information may be a specific execution rule, or a feature related to the execution rule. For details, refer to operation 303.

In one embodiment, referring to operation 302, the data analytics network element may further determine the execution rule information corresponding to the data based on the service type information associated with the data.

Operation 310: The data analytics network element sends a response result to the first network element.

The response result may be a response result for the first feature parameter in operation 305 or the first message. For details, refer to description of operation 210.

Operations 311 and 312: For details, refer to descriptions of operations 211 and 212.

Figure 4:
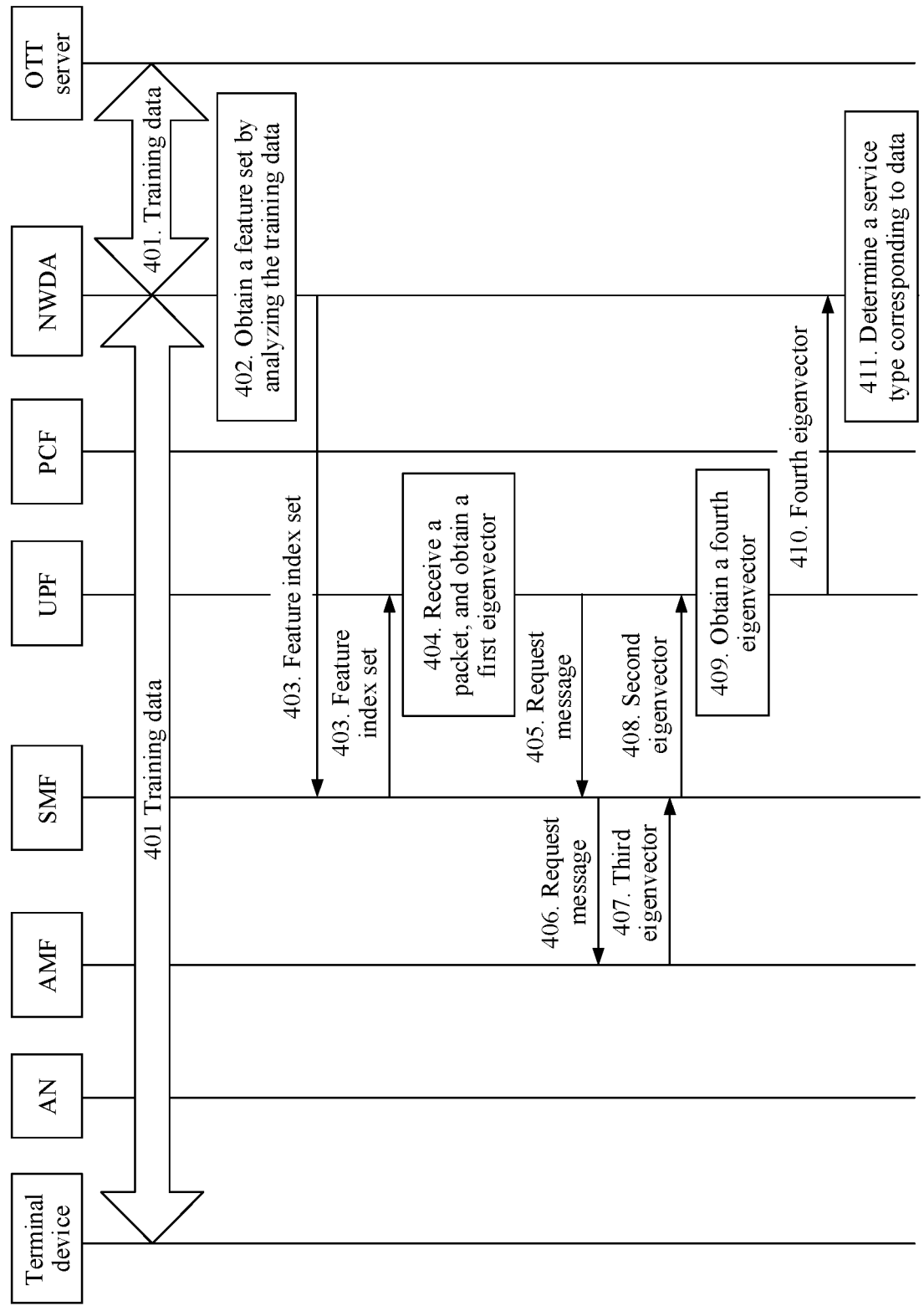
FIG. 4 is a schematic flowchart of a feature parameter obtaining method according to a third embodiment of the present disclosure.

FIG. 4 is a schematic flowchart of a feature parameter obtaining method according to a third embodiment of the present disclosure. In this embodiment, an example in which the first network element is the UPF network element, the second network elements are the SMF network element and the AMF network element, and the data is data of a video service is used for description. In this embodiment, the UPF network element obtains an eigenvector whose packet corresponds to a feature index set. The method in this embodiment includes the following operations.

Operation 401: An NWDA network element obtains training data.

For details, refer to description of operation 201.

Operation 402: The NWDA network element obtains a feature set by analyzing the training data.

In this operation, the feature set of the video service that is obtained by the data analytics network element is <a terminal device type, an APN, a time, a size of a first packet in a data flow, an average size of all packets in the data flow, entropy values of sizes of all the packets in the data flow>. For details, refer to description of operation 202.

Operation 403: The NWDA network element sends the feature index set to the UPF network element.

The NWDA network element sends the feature index set corresponding to the video service to the UPF network element. For example, the feature index set of the video service is <1, 2, 4, 5, 6, 7> or <110111100>. Specifically, for a relevant content of the feature index set, refer to description of operation 202.

The NWDA network element sends the feature index set to the UPF network element by using the SMF network element. For a specific sending method, refer to description of operation 203.

Operation 404: The UPF network element receives a user plane packet, and obtains, based on the received packet and the feature index set, a first eigenvector whose packet corresponds to a first part of feature in the feature set.

The UPF network element learns, through analysis, that the four features in the feature set, namely, the time, the size of the first packet in the data flow, the average size of all packets in the data flow and the entropy values of the sizes of all the packets in the data flow, that is, first part of features in the feature set corresponding to the video service, can be obtained by the UPF network element itself. Another feature, such as a terminal device type and an APN, needs to be obtained from the AMF network element and the SMF network element, that is, the two features are second part of features in the feature set corresponding to the video service.

The UPF network element can generate a first eigenvector <Null, Null, NA, 0.625, 0.1, 0.5, 0.25, NA, NA> whose packet corresponds to the feature set. In this embodiment, the eigenvector is the feature parameter in the first embodiment of the present disclosure.

For details of this operation, refer to description of operation 204.

Operation 405: The UPF network element sends a request message to the SMF network element, where the request message is used to request a second eigenvector whose data of the packet corresponds to the second part of feature in the feature set.

The request message includes identification information of the terminal device and an index of the feature set.

For details of this operation, refer to description of operation 205.

Operation 406: The SMF network element sends a request message to the AMF network element, where the request message is used to request a third eigenvector whose data of the packet corresponds to the second part of feature in the feature set.

The request message includes identification information of the terminal device and an index of the feature set.

For details of this operation, refer to description of operation 205.

Operation 407: The AMF network element sends the third eigenvector to the SMF network element.

The AMF network element can receive the feature index set corresponding to the video service from the SMF network element. The AMF network element can learn that the feature set corresponding to the video service is <a terminal device type, an APN, a time, a size of a first packet in a data flow, an average size of all packets in the data flow, entropy values of sizes of all the packets in the data flow>. The AMF network element learns, through analysis, that the terminal device type in the feature set is the feature that can be obtained by the AMF network element itself. The AMF network element can obtain the terminal device type, for example, iPhone 7, based on the identification information of the terminal device. The AMF network element can generate a third eigenvector <iPhone 7, Null, NA, Null, Null, Null, NA, NA> corresponding to the feature set. The normalized third eigenvector may be <0.9, Null, NA, Null, Null, Null, NA, NA>.

For details of this operation, refer to description of operation 206.

The AMF network element can send the third eigenvector to the UPF network element by using the SMF network element.

Operation 408: The SMF network element sends the second eigenvector to the UPF network element.

The SMF network element receives the feature index set of the video service from the UPF network element. The SMF network element can learn that the feature set corresponding to the video service is <a terminal device type, an APN, a time, a size of a first packet in a data flow, an average size of all packets in the data flow, entropy values of sizes of all the packets in the data flow>. The SMF network element learns, through analysis, that the APN in the feature set is the feature that can be obtained by the SMF network element itself. The SMF network element can obtain the APN, for example, an IMS APN, based on the identification information of the terminal device. The SMF network element can generate a second eigenvector <Null, IMS APN, NA, Null, Null, Null, NA, NA> corresponding to the feature set. The normalized second eigenvector is <Null, 1, NA, Null, Null, Null, NA, NA>.

For details of this operation, refer to description of operation 206.

The SMF network element sends the second eigenvector to the UPF network element.

Operation 409: The UPF network element obtains a fourth eigenvector corresponding to the feature index set based on the first eigenvector, the second eigenvector and the third eigenvector.

The fourth eigenvector is <0.9, 1, NA, 0.625, 0.1, 0.5, 0.25, NA, NA>. For details of this operation, refer to description of operation 206.

Operation 410: The UPF network element sends the fourth eigenvector to the NWDA network element.

Operation 411: The NWDA network element determines, based on the third eigenvector, that the service type associated with the packet is a video service.

For details, refer to description of operation 209.

The method in this embodiment may further include sending, by the NWDA network element, a response result for the fourth eigenvector to the UPF network element. The response result includes that the service type corresponding to the packet is the video service. After receiving the response result, the UPF network element processes the packet based on a type of the video service, for example, forwarding the packet based on a priority of the video service. For details, refer to descriptions of operation 201 and operation 211.

Figure 5:
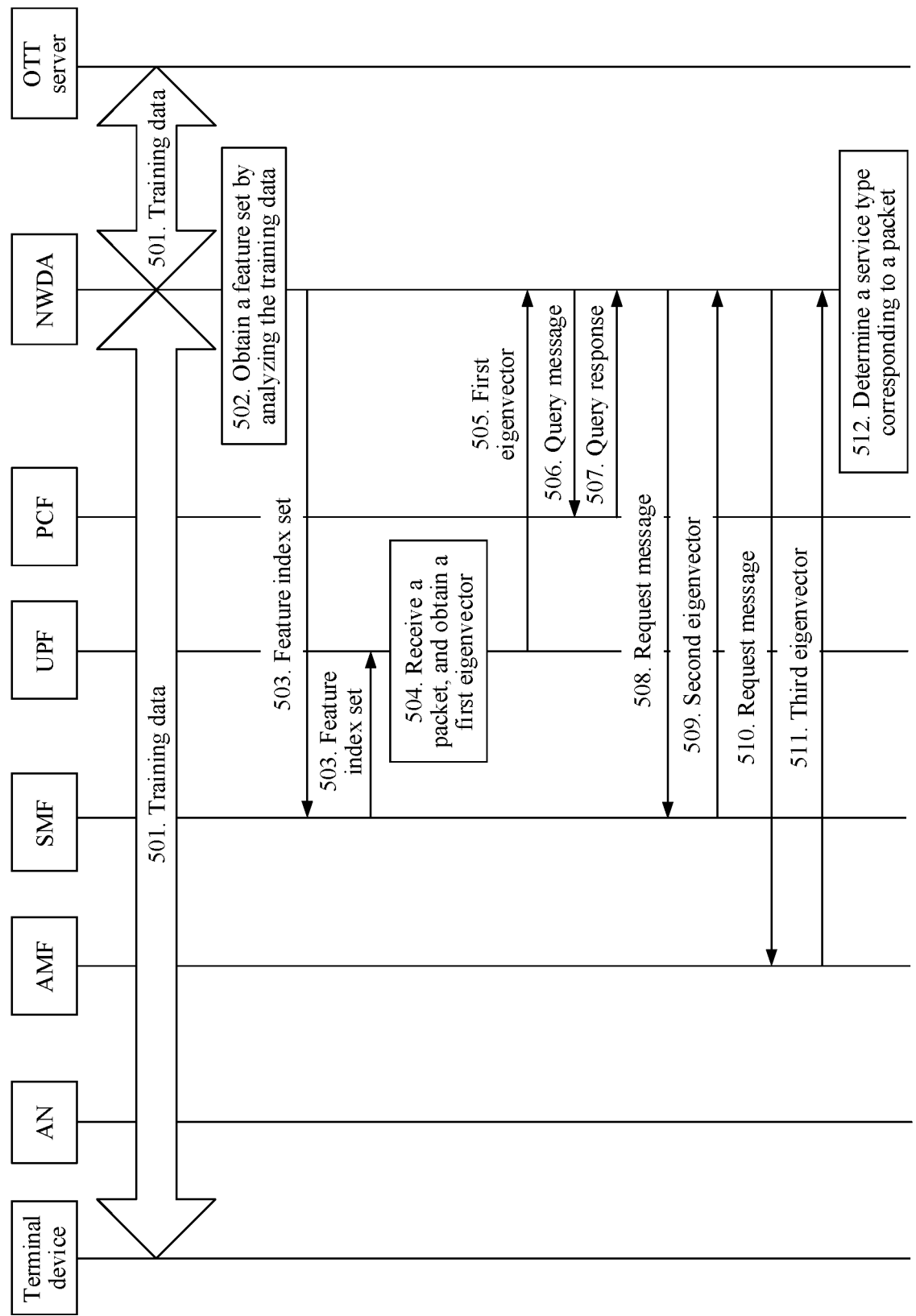
FIG. 5 is a schematic flowchart of a feature parameter obtaining method according to a fourth embodiment of the present disclosure.

FIG. 5 is a schematic flowchart of a data analysis method according to a fourth embodiment of the present disclosure. In this embodiment, an example in which the first network element is the UPF network element, the second network elements are the SMF network element and the AMF network element, and the data is data of a video service is used for description. In this embodiment, the NWDA network element obtains an eigenvector whose packet corresponds to a feature index set. The data analysis method in this embodiment includes the following operations.

Operations 501 to 504: For details, refer to descriptions of operations 401 to 404.

Operation 505: The UPF network element sends the first eigenvector to the NWDA network element.

Specifically, the UPF network element can send the first eigenvector <Null, Null, NA, 0.625, 0.1, 0.5, 0.25, NA, NA> to the NWDA network element by using the SMF network element.

The UPF network element may further send the identification information of the terminal device corresponding to the packet to the NWDA network element.

Operation 506: The NWDA network element sends a query message to the PCF network element, where the query message is used to query the AMF network element and the SMF network element registered by the terminal device corresponding to the packet.

Specifically, after receiving the first eigenvector, the NWDA network element determines that the first eigenvector is not the eigenvector whose packet corresponds to the feature index set. The NWDA network element determines, based on the feature in the feature set, that the eigenvector needs to be obtained from the AMF network element and the SMF network element. The NWDA network element sends the query message to the PCF network element, to query the AMF network element and the SMF network element registered by the terminal device.

Operation 507: The NWDA network element receives a query response from the PCF network element.

Specifically, the query response can include respective identifiers of the AMF network element and the SMF network element that are registered by the terminal device.

Operation 508: The NWDA network element sends a request message to the SMF network element, where the request message is used to request a second eigenvector whose packet corresponds to the second part of feature in the feature set.

The SMF network element is the SMF network element obtained by querying by the NWDA network element in operation 507.

The request message includes identification information of the terminal device and an index of the feature set.

Operation 509: The SMF network element sends the second eigenvector to the NWDA network element.

The second eigenvector may be <Null, 1, NA, Null, Null, Null, NA, NA>.

For details of a process of determining, by the SMF network element, the second eigenvector, refer to description of operation 206.

Operation 510: The NWDA network element sends a request message to the AMF network element, where the request message is used to request a third eigenvector whose packet corresponds to the second part of feature in the feature set.

The AMF network element is the AMF network element obtained by querying by the NWDA network element in operation 507.

The request message includes identification information of the terminal device and an index of the feature set.

Operation 511: The AMF network element sends the third eigenvector to the NWDA network element.

The third eigenvector may be <0.9, Null, NA, Null, Null, Null, NA, NA>.

For details of a process of determining, by the AMF network element, the third eigenvector, refer to description of operation 206.

Operation 512: The NWDA network element determines that the service type corresponding to the packet is a video service type.

Specifically, the NWDA network element can generate, based on the received first eigenvector, the second eigenvector and the third eigenvector, a fourth eigenvector <0.9, 1, NA, 0.625, 0.1, 0.5, 0.25, NA, NA> whose packet corresponds to the feature set. The NWDA network element determines, based on the fourth eigenvector, that the service type corresponding to the packet is a video service type. For details, refer to description of operation 209.

The method in this embodiment may further include sending, by the NWDA network element, a response result for the fourth eigenvector to the UPF. The response result includes that the service type corresponding to the packet is the video service. After receiving the response result, the UPF network element processes the packet based on a type of the video service, for example, forwarding the packet based on a priority of the video service. For details, refer to descriptions of operation 201 and operation 211.

Figure 6:
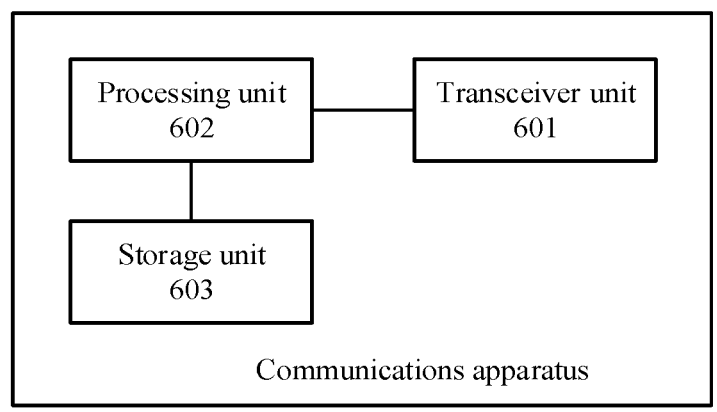
FIG. 6 is a schematic diagram of a communications apparatus according to an embodiment of the present disclosure.

FIG. 6 is a schematic diagram of a communications apparatus according to an embodiment of the present disclosure. The communications apparatus includes a transceiver unit 601, a processing unit 602, and a storage unit 603. The transceiver unit 601, the processing unit 602, and the storage unit 603 may be physically separated units, or may be integrated into one or more physical units. This is not limited herein.

The transceiver unit 601 is configured to implement content exchange between the processing unit 602 and another unit or network element. Specifically, the transceiver unit 601 may be a communications interface of the communications apparatus, or may be a transceiver circuit or a transceiver, or may be a transceiver machine. In some possible manners, the transceiver unit 601 may further be an antenna device and a circuit matching the antenna device. The transceiver unit 601 may alternatively be a communications interface or a transceiver circuit of the processing unit 602. In one embodiment, the transceiver unit 601 may further be an independent chip.

Although FIG. 6 shows only one transceiver unit 601, the communications apparatus may further include a plurality of transceiver units 601, or the transceiver unit 601 includes a plurality of sub transceiver units. The transceiver unit 601 may further include a sending unit and a receiving unit.

The processing unit 602 is configured to implement data processing performed by the communications apparatus. The processing unit 602 may be a processing circuit or may be a processor. The processor may be a central processing unit (CPU), a network processor (NP), or a combination of the CPU and the NP. The processor may be a hardware chip. The hardware chip may be an application-specific integrated circuit (ASIC), a programmable logic device (PLD), or a combination thereof. The PLD may be a complex programmable logical device (CPLD), a field-programmable gate array (FPGA), a generic array logic (GAL), or a combination thereof.

Although FIG. 6 shows only one processing unit 602, the communication apparatus may further include a plurality of processing units, or the processing unit 602 includes a plurality of sub data processing units. Specifically, the processor may be a single-core (single-CPU) processor, or may be a multi-core (multi-CPU) processor.

The storage unit 603 is configured to store a computer instruction executed by the processing unit 602. The storage unit 603 may be a storage circuit or may be a memory. The memory may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

The storage unit 603 may be a unit independent of the processing unit 602, or may be a storage unit in the processing unit 602. This is not limited herein. Although FIG. 6 shows only one storage unit 603, the communications apparatus may further include a plurality of storage units 603, or the storage unit 603 includes a plurality of sub storage units.

In the embodiments of the present disclosure, the processing unit 602 may exchange content with another network element by using the transceiver unit 601. For example, the processing unit 602 obtains or receives content from the another network element. If the processing unit 602 and the transceiver unit 601 are two physically separated components, the processing unit 602 may exchange content with another unit within the communications apparatus without using the transceiver unit 601.

In a possible implementation, the transceiver unit 601, the processing unit 602, and the storage unit 603 may be connected to each other by using a bus. The bus may be a peripheral component interconnect (PCI) bus, an extended industry standard architecture (EISA) bus, or the like. The bus may be classified into an address bus, a data bus, a control bus, and the like.

In this embodiment of the present disclosure, the processing unit 602 enables, based on the computer instruction stored in the storage unit 603, the communications apparatus to implement the methods in the first embodiment to the sixth embodiment in the present disclosure.

Specifically, the communications apparatus may be a feature parameter obtaining apparatus, for example, a UP network element. The communications apparatus may further be a data analytics network element, for example, an NWDA network element. The communications apparatus may further be a session management network element, or an AMF network element, or an access device.

When the communications apparatus is the apparatus for obtaining the feature parameter, the transceiver unit 601 is configured to obtain feature set information from a data analytics network element, where a feature set corresponding to the feature set information includes a first part of feature and a second part of feature; and the processing unit 602 is configured to obtain a first feature parameter of the first part of feature when data corresponds to the first part of feature. The transceiver unit 601 is further configured to: send a request message to at least one second network element, where the request message is used to request a second feature parameter of the second part of feature when the data corresponds to the second part of feature; receive the second feature parameter from the at least one second network element; and send, based on the first feature parameter and the second feature parameter, a third feature parameter of the feature set when the data corresponds to the feature set to the data analytics network element.

In a possible implementation, the second part of feature is a feature, in the feature set, that the first network element needs to obtain from the at least one second network element.

In a possible implementation, the request message includes at least one of identification information of a terminal device corresponding to the data, address information of the terminal device and the feature set information.

In a possible implementation, the second part of feature includes at least one of a type of the terminal device corresponding to the data, identification information of a cell in which the terminal device is located and signal quality of the cell in which the terminal device is located.

In a possible implementation, the transceiver unit 601 is further configured to obtain a response result from the data analytics network element for the third feature parameter, and the processing unit 602 is further configured to process the data based on the response result.

In a possible implementation, the processing unit is configured to obtain, based on the response result, a service type associated with the data or an execution rule associated with the data. The processing unit is specifically configured to forward the data based on service priority information indicated in the execution rule associated with the data; or the processing unit is configured to add label information of the service type to the data based on the service type associated with the data or the execution rule associated with the data; or the processing unit is configured to add scheduling priority information to the data based on the service type associated with the data or the execution rule associated with the data; or the processing unit is configured to perform charging statistics on the data based on the service type associated with the data or the execution rule associated with the data; or the processing unit is configured to determine that a destination address of the data is an address of the terminal device and the terminal device is in an idle state, and the transceiver unit is configured to send paging priority information of the terminal device based on the service type associated with the data or the execution rule associated with the data.

In a possible implementation, the feature set information is a feature index set. The first feature parameter, the second feature parameter or the third feature parameter is an eigenvector. The feature set information corresponds to at least one service type or at least one execution rule. The response result includes service type information associated with the data and/or execution rule information associated with the data.

In this embodiment, the transceiver unit 601 is further configured to implement content receiving and sending operation between the first network element and an external network element in the first embodiment to the fourth embodiment in the present disclosure. The processing unit 602 is further configured to implement a processing operation for data or signaling inside the first network element in the first embodiment to the fourth embodiment in the present disclosure. For example, the processing unit 602 is configured to implement an operation in operation 204, operation 211 or operation 212 in the first embodiment.

In this embodiment, the processing unit 602 enables, based on the computer instruction stored in the storage unit 603, the processing unit 602 to implement the operation performed by the first network element in the first embodiment to the fourth embodiment in the present disclosure.

Specifically, in a possible implementation, the processing unit 602 uses, based on the computer instruction stored in the storage unit 603, the transceiver unit 601 to obtain feature set information from a data analytics network element, where a feature set corresponding to the feature set information includes a first part of feature and a second part of feature, obtains a first feature parameter of the first part of feature when data corresponds to the first part of feature, uses the transceiver unit 601 to send a request message to at least one second network element, where the request message is used to request a second feature parameter of the second part of feature when the data corresponds to the second part of feature, uses the transceiver unit 601 to receive the second feature parameter from the at least one second network element, and uses, based on the first feature parameter and the second feature parameter, the transceiver unit 601 to send a third feature parameter of the feature set when the data corresponds to the feature set to the data analytics network element.

In a possible implementation, the processing unit 602 further uses the transceiver unit 601 to obtain a response result from the data analytics network element for the third feature parameter, and processes the data based on the response result.

In a possible implementation, the processing unit 602 is configured to obtain, based on the response result, a service type associated with the data or an execution rule associated with the data. The processing unit 602 forwards the data based on service priority information indicated in the execution rule associated with the data; or the processing unit 602 adds label information of the service type to the data based on the service type associated with the data or the execution rule associated with the data; or the processing unit 602 adds scheduling priority information to the data based on the service type associated with the data or the execution rule associated with the data; or the processing unit 602 performs charging statistics on the data based on the service type associated with the data or the execution rule associated with the data; or the processing unit 602 determines that a destination address of the data is an address of the terminal device and the terminal device is in an idle state, and uses, based on the service type associated with the data or the execution rule associated with the data, the transceiver unit 601 to send paging priority information of the terminal device.

When the communications apparatus is a data analysis apparatus, for example, an NWDA network element, the transceiver unit 601 is configured to send feature set information to a first network element, where a feature set corresponding to the feature set information includes a first part of feature and a second part of feature, receive a first feature parameter, data of which corresponds to the first part of feature, from the first network element, send a request message to at least one second network element, where the request message is used to request a second feature parameter of the second part of feature when the data corresponds to the second part of feature, and receive the second feature parameter from the at least one second network element; and the processing unit 602 is configured to determine service type information corresponding to the data or execution rule information corresponding to the data based on the first feature parameter and the second feature parameter.

In a possible implementation, the second part of feature is a feature, in the feature set, that the data analytics network element needs to obtain from the second network element.

In a possible implementation, the transceiver unit 601 is further configured to receive at least one of identification information of a terminal device corresponding to the data, address information of the terminal device and the feature set information that are from the first network element.

In a possible implementation, the second part of feature includes at least one of a type of the terminal device corresponding to the data, identification information of a cell in which the terminal device is located and signal quality of the cell in which the terminal device is located.

In a possible implementation, the processing unit 601 is configured to determine a third feature parameter of the feature set when the data corresponds to the feature set based on the first feature parameter and the second feature parameter, and determine service type information corresponding to the data and execution rule information corresponding to the data based on the third feature parameter.

In a possible implementation, the transceiver unit 601 is further configured to send the service type information corresponding to the data or the execution rule information corresponding to the data to the first network element.

In a possible implementation, the first feature parameter, the second feature parameter or the third feature parameter is an eigenvector. The feature set information is a feature index set. The feature set information corresponds to at least one service type or at least one execution rule.

In a possible implementation, the transceiver unit is further configured to obtain training data, and the processing unit is further configured to obtain the feature set information based on the training data.

In this embodiment, the transceiver unit 601 is further configured to implement content receiving and sending operation between the data analytics network element and an external network element in the first embodiment to the fourth embodiment in the present disclosure. The processing unit 602 is further configured to implement a processing operation for data or signaling inside the data analytics network element in the first embodiment to the fourth embodiment in the present disclosure. For example, the processing unit 602 is configured to implement an operation in operation 201, operation 202 or operation 209 in the first embodiment.

In this embodiment, the processing unit 602 enables, based on the computer instruction stored in the storage unit 603, the processing unit 602 to implement the operation performed by the data analytics network element in the first embodiment to the fourth embodiment in the present disclosure.

Specifically, in a possible implementation, the processing unit 602 uses the transceiver unit 601 to send feature set information to a first network element, where a feature set corresponding to the feature set information includes a first part of feature and a second part of feature, uses the transceiver unit 601 to receive a first feature parameter, data of which corresponds to the first part of feature, from the first network element, uses the transceiver unit 601 to send a request message to at least one second network element, where the request message is used to request a second feature parameter of the second part of feature when the data corresponds to the second part of feature, uses the transceiver unit 601 to receive the second feature parameter from the at least one second network element, and determines service type information corresponding to the data or execution rule information corresponding to the data based on the first feature parameter and the second feature parameter.

In a possible implementation, the processing unit 602 is configured to determine a third feature parameter of the feature set when the data corresponds to the feature set based on the first feature parameter and the second feature parameter, and determine service type information corresponding to the data and execution rule information corresponding to the data based on the third feature parameter.

In a possible implementation, the processing unit 602 uses the transceiver unit 601 to send the service type information corresponding to the data or the execution rule information corresponding to the data to the first network element.

In a possible implementation, the processing 602 uses the transceiver unit 601 to obtain training data, and obtains the feature set information based on the training data.

When the communication apparatus is a second network element, the transceiver unit 601 is configured to obtain feature set information from a first network element; and the processing unit 602 is configured to obtain a feature parameter of a partial feature in a feature set when data corresponds to the partial feature. The transceiver unit 601 is further configured to send the feature parameter to the first network element.

In a possible implementation, the transceiver unit receives a request message from the first network element, where the request message includes the feature set information. The request message further includes identification information of a terminal device corresponding to data and/or address information of the terminal device.

In this embodiment, the transceiver unit 601 is further configured to implement a content receiving and sending operation between the second network element and an external network element in the first embodiment to the fourth embodiment in the present disclosure. The processing unit 602 is further configured to implement a processing operation for data or signaling inside the second network element in the first embodiment to the fourth embodiment in the present disclosure. For example, the processing unit 602 is configured to implement an operation in operation 206 in the first embodiment.

In this embodiment, the processing unit 602 enables, based on the computer instruction stored in the storage unit 603, the processing unit to implement the operation performed by the second network element in the first embodiment to the fourth embodiment in the present disclosure.

Specifically, in a possible implementation, the processing unit 602 uses the transceiver unit 601 to obtain the feature set information from the first network element, obtains a feature parameter of a partial feature in the feature set when the data corresponds to the partial feature in the feature set, and uses the transceiver unit 601 to send the feature parameter to the first network element.

In the communications apparatus in the present disclosure, the second part of feature is a feature, in the feature set, that the first network element needs to obtain from the at least one second network element. The request message may include at least one of identification information of a terminal device corresponding to the data, address information of the terminal device and the feature set information. The second part of feature includes at least one of a type of the terminal device corresponding to the data, identification information of a cell in which the terminal device is located and signal quality of the cell in which the terminal device is located. The feature set information is a feature index set. The first feature parameter, the second feature parameter or the third feature parameter is an eigenvector. The feature set information corresponds to at least one service type or at least one execution rule.

In the embodiments of the present disclosure, for ease of understanding, a plurality of examples are used for description. However, these examples are merely some examples, and are not necessarily best implementations to implement the present disclosure.

In the embodiments of the present disclosure, for ease of description, the request message, the response message and other names of messages of various types are used. However, these messages are merely examples for describing content required to be carried or a function to be implemented, and a specific name of the message is not limited in the present disclosure. For example, the specific name of the message may further be a first message, a second message, a third message, or the like. These messages may be some specific messages, or some fields in a message. These messages may further represent various service operations.

All or some of the foregoing embodiments may be implemented by using software, hardware, firmware, or any combination thereof. When software is used to implement the embodiments, all or some of the embodiments may be implemented in a form of a computer program product. The computer program product may include one or more computer instructions. When the computer program instructions are loaded and executed on the computer, the procedure or functions according to the embodiments of the present disclosure are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a soft disk, a hard disk, or a magnetic disk), an optical medium (for example, a DVD), a semiconductor medium (for example, a solid state disk (SSD)), or the like.

A person of ordinary skill in the art may be aware that, in combination with the examples described in the embodiments disclosed in this specification, units and algorithm operations may be implemented by using electronic hardware or a combination of computer software and electronic hardware. Whether the functions are performed by using hardware or software depends on particular applications and design constraint conditions of the technical solutions. A person skilled in the art may use different methods to implement the described functions for the particular applications, but it should not be considered that the implementation goes beyond the scope of the present disclosure.

It may be clearly understood by persons skilled in the art that, for the purpose of convenient and brief description, for a detailed working process of the foregoing system, apparatus, and unit, refer to a corresponding process in the foregoing method embodiments. This is not limited herein.

In the several embodiments provided in the present disclosure, it should be understood that the disclosed system, apparatus, and method may be implemented in other manners. For example, the described apparatus embodiment is merely for illustration purposes. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in the form of a software functional unit and sold or used as an independent product, the functions may be saved in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of the present disclosure. The foregoing storage medium includes: any medium that can store program code, such as a USB flash disk, a removable hard disk, a read-only memory, a random access memory, a magnetic disk, or a compact disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A feature parameter obtaining method, comprising:
    obtaining, by a first network element, feature set information from a data analytics network element, wherein a feature set corresponding to the feature set information comprises a first part of feature and a second part of feature;
    obtaining, by the first network element, a first feature parameter of the first part of feature when data corresponds to the first part of feature;
    sending, by the first network element, a request message to at least one second network element, wherein the request message is used to request a second feature parameter of the second part of feature when the data corresponds to the second part of feature;
    receiving, by the first network element, the second feature parameter from the at least one second network element; and
    sending, by the first network element based on the first feature parameter and the second feature parameter, a third feature parameter of the feature set when the data corresponds to the feature set to the data analytics network element.

2. The method according to claim 1, wherein the second part of feature is a feature, in the feature set, that the first network element needs to obtain from the at least one second network element.

3. The method according to claim 1, wherein the request message comprises at least one of identification information of a terminal device corresponding to the data, address information of the terminal device and the feature set information.

4. The method according to claim 1, wherein the second part of feature comprises at least one of a type of the terminal device corresponding to the data, identification information of a cell in which the terminal device is located and signal quality of the cell in which the terminal device is located.

5. The method according to claim 1, further comprising:
obtaining, by the first network element, a response result from the data analytics network element for the third feature parameter; and
processing, by the first network element, the data based on the response result.

6. The method according to claim 5, further comprising:
obtaining, by the first network element based on the response result, a service type associated with the data or an execution rule associated with the data, wherein
the processing, by the first network element, the data based on the response result comprises:
forwarding, by the first network element, the data based on service priority information indicated in the execution rule associated with the data; or
adding, by the first network element, label information of the service type to the data based on the service type associated with the data or the execution rule associated with the data; or
adding, by the first network element, scheduling priority information to the data based on the service type associated with the data or the execution rule associated with the data; or
performing, by the first network element, charging statistics on the data based on the service type associated with the data or the execution rule associated with the data; or
determining, by the first network element, that a destination address of the data is an address of the terminal device and the terminal device is in an idle state, and sending, by the first network element, paging priority information of the terminal device based on the service type associated with the data or the execution rule associated with the data.

7. The method according to claim 1, wherein the feature set information is a feature index set.

8. The method according to claim 1, wherein the first feature parameter, the second feature parameter or the third feature parameter is an eigenvector.

9. The method according to claim 1, wherein the feature set information corresponds to at least one service type or at least one execution rule.

10. The method according to claim 1, wherein the response result comprises service type information associated with the data and/or execution rule information associated with the data.

11. An apparatus, comprising at least one processor coupled with a memory, wherein the at least one processor is configured to execute instructions stored in the memory, to enable the apparatus to perform the following operations:
obtaining feature set information from a data analytics network element, wherein a feature set corresponding to the feature set information comprises a first part of feature and a second part of feature;
obtaining a first feature parameter of the first part of feature when data corresponds to the first part of feature;
sending a request message to at least one second network element, wherein the request message is used to request a second feature parameter of the second part of feature when the data corresponds to the second part of feature;
receiving the second feature parameter from the at least one second network element; and
sending, based on the first feature parameter and the second feature parameter, a third feature parameter of the feature set when the data corresponds to the feature set to the data analytics network element.

12. The apparatus according to claim 11, wherein the second part of feature is a feature, in the feature set, that the apparatus needs to obtain from the at least one second network element.

13. The apparatus according to claim 11, wherein the request message comprises at least one of identification information of a terminal device corresponding to the data, address information of the terminal device and the feature set information.

14. The apparatus according to claim 11, wherein the second part of feature comprises at least one of a type of the terminal device corresponding to the data, identification information of a cell in which the terminal device is located and signal quality of the cell in which the terminal device is located.

15. The apparatus according to claim 11, wherein the operations further comprise:
obtaining a response result from the data analytics network element for the third feature parameter; and
processing the data based on the response result.

16. The apparatus according to claim 15, wherein the operations further comprise:
obtaining, based on the response result, a service type associated with the data or an execution rule associated with the data, wherein
the processing the data based on the response result comprises:
forwarding the data based on service priority information indicated in the execution rule associated with the data; or
adding label information of the service type to the data based on the service type associated with the data or the execution rule associated with the data; or
adding scheduling priority information to the data based on the service type associated with the data or the execution rule associated with the data; or
performing charging statistics on the data based on the service type associated with the data or the execution rule associated with the data; or
determining that a destination address of the data is an address of the terminal device and the terminal device is in an idle state, and sending paging priority information of the terminal device based on the service type associated with the data or the execution rule associated with the data.

17. The apparatus according to claim 11, wherein the feature set information is a feature index set.

18. The apparatus according to claim 11, wherein the first feature parameter, the second feature parameter or the third feature parameter is an eigenvector.

19. The apparatus according to claim 11, wherein the feature set information corresponds to at least one service type or at least one execution rule.

20. A system, comprising:
a first network apparatus, configured to obtain feature set information from a data analytics network element, wherein a feature set corresponding to the feature set information comprises a first part of feature and a second part of feature, to obtain a first feature parameter of the first part of feature when data corresponds to the first part of feature, to send a request message to at least one second network apparatus, wherein the request message is used to request a second feature parameter of the second part of feature when the data corresponds to the second part of feature, to receive the second feature parameter from the at least one second network apparatus, and to send, based on the first feature parameter and the second feature parameter, a third feature parameter of the feature set when the data corresponds to the feature set to the data analytics network element; and a data analytics apparatus, configured to send feature set information to the first network apparatus.

* * * * *